United States Patent [19]

Evans

[11] Patent Number: 4,852,392
[45] Date of Patent: Aug. 1, 1989

[54] HIGH PRESSURE DRUM TESTING APPARATUS AND METHOD

[76] Inventor: Robert G. Evans, 41 Colony Rd., Gretna, La. 70056

[21] Appl. No.: 231,867

[22] Filed: Aug. 12, 1988

[51] Int. Cl.[4] ............................................. G01M 3/04
[52] U.S. Cl. ....................................... 73/41.2; 73/45.5
[58] Field of Search ............. 73/41, 41.2, 45.5, 49.2 R

[56] References Cited

U.S. PATENT DOCUMENTS

| | | | |
|---|---|---|---|
| 3,306,097 | 2/1967 | Wimmer | 73/49.2 R |
| 3,987,664 | 10/1976 | Hass et al. | 73/49.2 R |
| 4,686,850 | 8/1987 | Evans | 73/45.5 |
| 4,747,298 | 5/1988 | McDaniel | 73/49.3 |

Primary Examiner—Stewart J. Levy
Assistant Examiner—Michele Simons
Attorney, Agent, or Firm—Pravel, Gambrell, Hewitt, Kimball & Krieger

[57] ABSTRACT

A drum testing apparatus simultaneously tests the bottom chine, sidewall vertical chine, and wall integrity of a typical drum, such as a 55-gallon drum. The apparatus includes a frame for supporting the drum to be tested in a generally upright position. A turntable base is moveably supported by the frame and provides a rotatable surface for supporting and turning the drum at its bottom end portion. A reservoir immerses the drum bottom chine and the top chine during testing and while the turntable base rotates the drum. A liquid spray simultaneously immerses the drum sidewall and the vertical chine during testing and while the drum rotates. A holder including a pair of spaced-apart flanged portions engages respectively the top end portion and the bottom end portion of the drum and preloads the drum end portions to prevent removal of the drum end portions during testing. An air pressure source pressurizes the drum interior during testing. Leakage is detected by bubbles appearing visually to an inspector as the entire drum outer surface is covered with water or a water and chemical solution during the testing procedure.

50 Claims, 14 Drawing Sheets

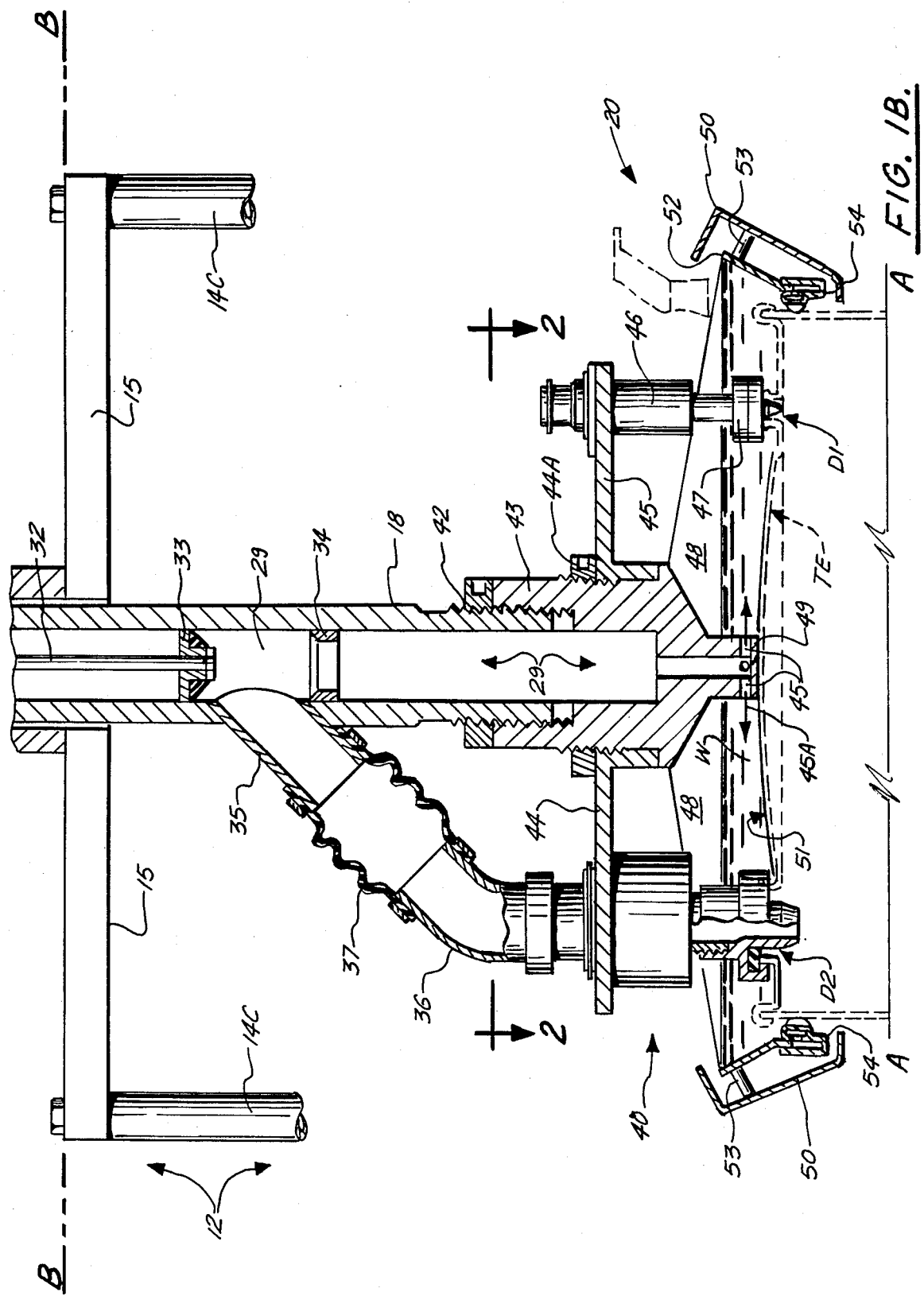

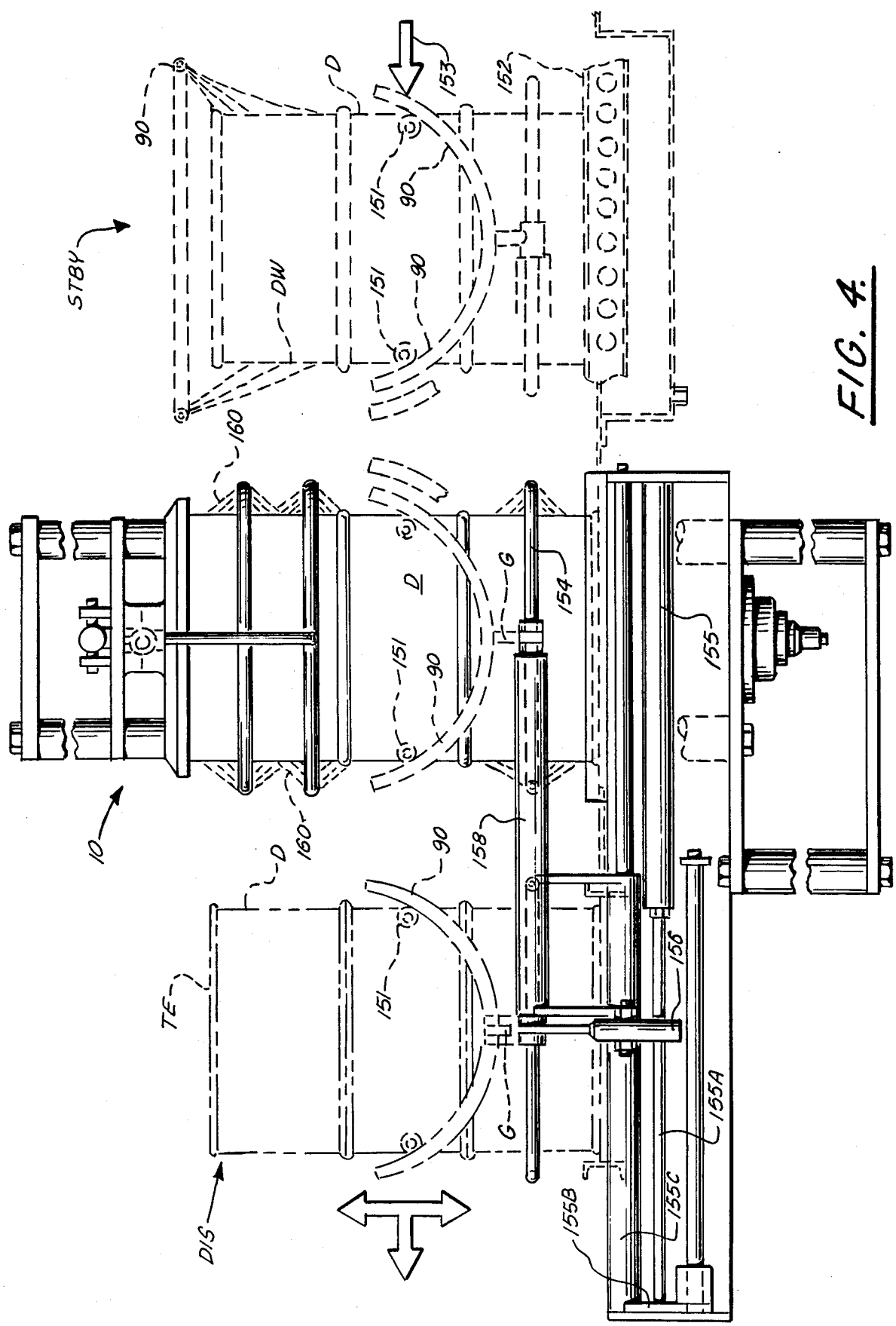

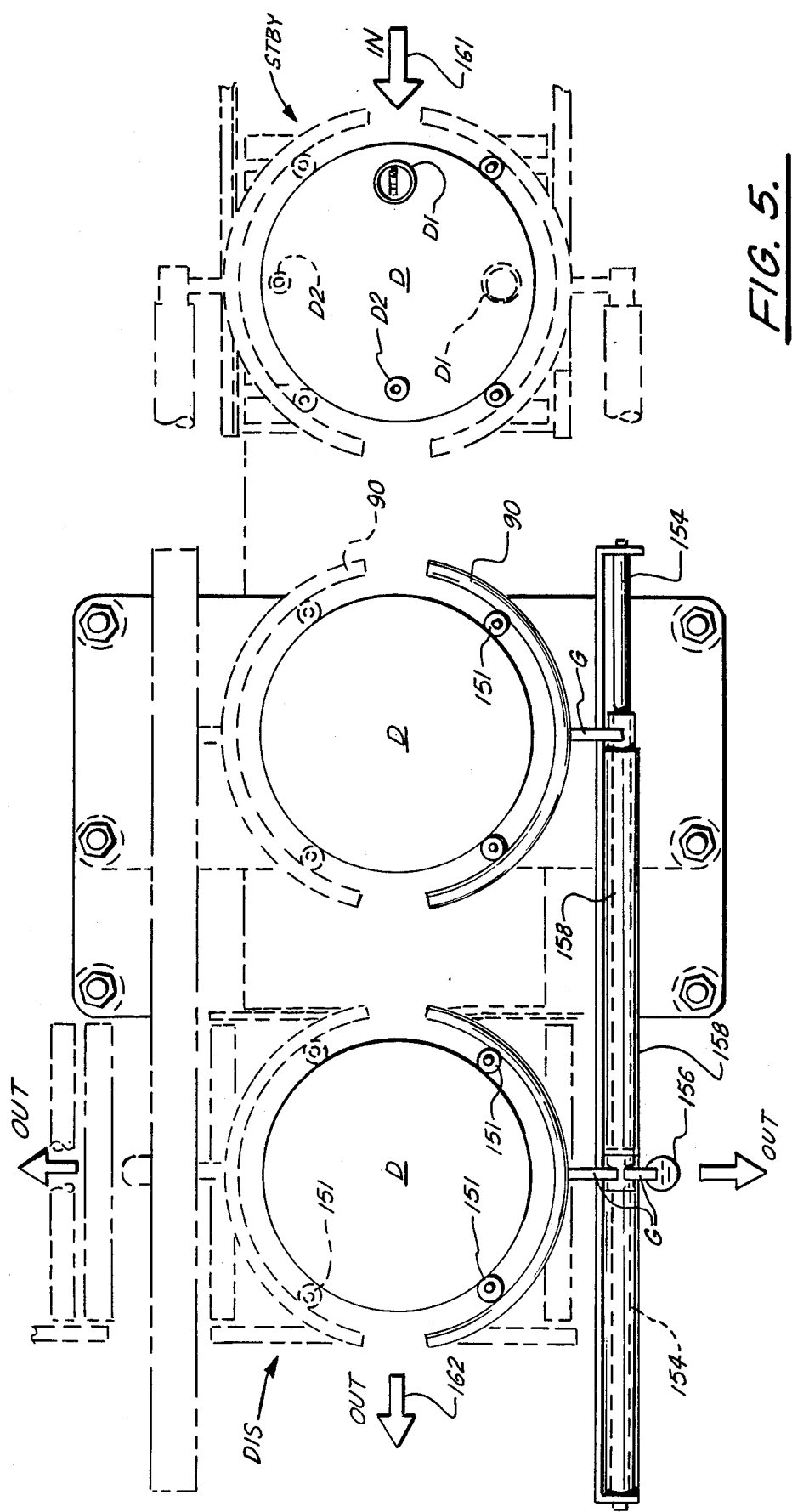

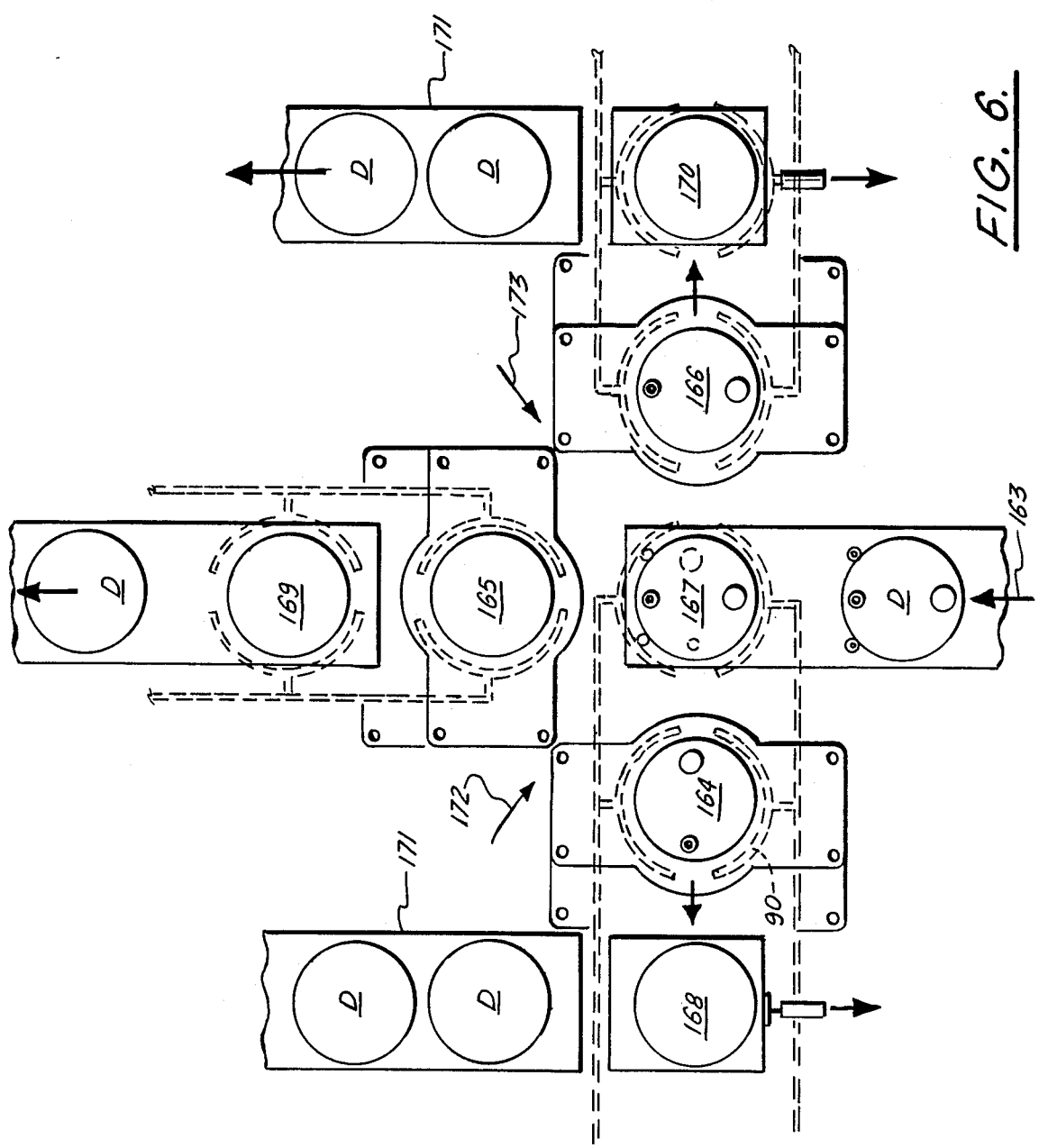

HIGH PRESSURE DRUM TESTING APPARATUS AND METHOD

BACKGROUND OF THE INVENTION

1. Field of the Invention:

The present invention relates to pressure testing of thin wall cylindrical drums (e.g., 55-gallon drums and the like), wherein multiple drum areas such as the vertical weld seam, top and bottom chines, drum side walls and ends can be simultaneously tested and at high pressures of 10–100 p.s.i.

2. General Background:

A number of thin wall containers, referred to generally as drums, are used for containing various liquid products for shipping. A common drum size which is used for the shipping of oil, chemicals, and the like, is a 55-gallon drum. These drums are usually metallic but can also be of plastic construction. The 55-gallon drum has a relatively small wall thickness of, for example, 14–24 gauge steel. In the construction of these thin-walled drums, a rectangular sheet of metal is first trimmed and shaped to be a "true" rectangle. The rectangle is then formed into a cylinder by welding a vertical seam that connects the two edges of the rectangle. This cylindrical member is then shaped as desired, adding, for example, one or more annular rings which extend outwardly and provide a rolling surface for moving the drum by rolling it. After the cylindrical drum sidewall is shaped as desired, circular drum ends are added, usually by machine.

One of the circular ends defines a bottom end and is a closed end. The other end is the top end of the drum and provides usually a pair of spaced-apart threaded openings, normally a larger opening and a smaller opening. These threaded openings are typically fitted with fittings and closure caps so that liquid can be added to or removed from the drum during its normal use and the drum can then be closed and sealed.

Another type of drum is similar except that one end, usually the top end, is fully removable with the removable end held in place for shipping or storage by a ring that clamps the head and body of the drum firmly together between a gasket seated between a curl on the head and a rounded surface rolled into the body of the drum. This type of construction enables the drum to be emptied under circumstances where it is desirable to have access to the drum through its entire top surface.

The assembly of metal drums as aforedescribed requires inspection of the drums for leakage because of the thin-walled construction of the drum and because of the presence of a number of seams where leakage might occur. Further, the drum wall itself can have small laminations or defects in the metal which could be the source of leakage. Often the leakage occurs after the drum has been filled with fluid, and thus is under increased load and pressure. When the drum is transported, moved, jolted, etc. any weak spots in the drum wall, in the seams and at the joint between the drum ends and the sidewall can fracture or open causing leakage and loss of product.

Because the drum wall and drum ends are relatively thin, pressurizing the drum beyond a few pounds per square inch (p.s.i.) has been avoided by the industry is routine assembly line testing. Typically, drums are tested at about seven (7) p.s.i. as a maximum. By pressurizing the drum to seven (7) p.s.i., an inspection of the drum can be made by manually spraying the drum with a wetting agent, such as soapy water. An inspector then views each of the seams for the presence of any bubbles. This is a time consuming and labor intensive process. Often testing is the weak link in the manufacturing process because it takes several seconds for an inspector to adequately check all of the seams of the drum.

Evans Cooperage, Inc. of Harvey, La. as well as most drum manufacturers employ a horizontal drum tester which holds the ends of the drum during testing using a clamping mechanism. However, testing has always been done at, or about seven (7) p.s.i. In this type of apparatus, the drum is rotated so that the welded seam is easily visable to the operator of the tester then sprayed with a fluid wetting agent, such as soapy water. An observer then visually inspects the drums for bubbles at the vertical seam and a small adjacent area of the horizontal rolled inseam which normally would be in the top and bottom of the drum. This horizontal tester typically only inspects these above-mentioned areas of the drum.

In this existing drum test system in order to improve the test quality, the bottom seam test requires that the drum be removed from the horizontal tester and placed in a separate station which is simply a "pan" of water. This pan of water extends upwardly approximately three to four inches from the bottom end of the drum upwardly along the sidewall of the drum, thus covering the seam between the sidewall of the drum and the drum bottom end. The pan is filled with a wetting agent, such as soapy water, and the drum is pressured internally to seven (7) p.s.i. and visually inspected for leaks. The drum is pressurized with approximately seven (7) p.s.i. air pressure by attaching a fitting supplied with a source of compressed air to the threaded opening at the top of the drum.

This pan test is a manual operation which requires a separate station, separate inspectors, and separate testing equipment. In another supplementary system, if a more accurate test is desired, the drum is pressurized to seven (7) p.s.i. and then mechanically submerged. A leak is indicated on any part of the entire surface by bubbles caused by air escaping from the area that leaks. This is more accurate than the conventional clamping method mentioned above and previously was very time consuming.

To speed up the above process, a multi-station submerged tester previously was developed by Evans. Whereas it was an improvement over previous methods of testing, it was limited to approximately seven (7) p.s.i. and would not totally locate the leak in the drum nor would it produce the shocking effect necessary to locate cold welds or tight lamination.

The testing of drums to seven (7) p.s.i. typically finds some of the obvious leaks in the drum which occur as a defect in manufacture. However, higher pressures would reveal areas which are suspect or weak yet do not readily leak air upon the application of the pressure of seven (7) p.s.i. The problem with using higher pressures for testing purposes is that the increased level of pressure can damage or rupture the drum ends or cause them to bulge. Thus, testing at higher pressures, i.e., above seven (7) p.s.i., has not been used in routine assembly line testing of drums.

If a drum could be tested at higher pressures, such as on the order of fifty (50) p.s.i., the drum could be "shocked" to reveal even very small defects, such as cold welds, defects in wall material such as laminations, and otherwise areas that would not initially show leakage, but which subsequently might open during handling or after filling of the drum. Another drum tester used by a European manufacturer, Van Leer of Holland, and others, employ helium. This is a very expensive machine and it suffers because it is not location specific. One knows there is a leak, but not where the leak is. It is also incapable of operating above 7 p.s.i. and lacks the ability to shock the drum for indicating leaks due to cold welds or tight laminations.

Cold welds can and do occur at times in the welding process due to some malfunction in the welding process or defects in the steel. A cold weld can often be sufficiently strong to go undetected in other types of testing and even when filling only to fail when the filled drum is subjected to subsequent rough handling, vibration in transit, or any one of numerous transportation and handling conditions to which most drums encounter after filling. A resultant leakage therefore is much more costly and potentially dangerous and hazardous than if such leak occurred at time of testing or even filling. A tight lamination or other similar defect in the steel used to produce the drum can similarly go undetected in other forms of testing and produce similar results and problems, as described above.

Another system, the differential pressure measurement system, detects a leak by an elaborate method of measuring pressure drop in the drum if a leak occurs. This system lacks the accuracy of the helium tester. It also suffers from the deficiency of the helium system in that it does not locate the leak nor does not provide for high pressure shocking.

Thus, it is an object of the present invention to provide an improved testing apparatus for the testing of thin wall metal drums and the like wherein the drum can be tested at high pressures, and shocked, (i.e., high pressure plus relatively short time period), in order to reveal even very small leaks which typically do not leak upon the introduction of pressure under ten (10) p.s.i. It is another object of the invention to provide a multiple test drum testing apparatus which simultaneously tests the drum wall, seams (both top and bottom), vertical weld, and at high pressures even up to one hundred fifty (150) p.s.i. without damaging the drum.

There are various patented constructions which relate to the testing of metal drums and the like. Examples of very early patents that relate to testing and containers can be seen in the Maede U.S. Pat. No. 1,547,126, entitled "Vacuum Testing Machine For Empty Cans"; the Wilsdorf U.S. Pat. No. 2,055,568, entitled "Testing Apparatus For Fluid Tight Casings"; and the Troxel U.S. Pat. No. 2,118,906, entitled "Advertising Demonstrator".

An apparatus for testing cans is the subject of the Wimmer U.S. Pat. No. 3,306,097. The Wimmer device uses a circular end plate to support one end portion of the can during testing (see FIG. 1 of the Wimmer '097 patent).

The McCoy U.S. Pat. No. 2,880,610, entitled "Sealing Unit For Drum Testers", shows a typical drum having a plurality of circumferential annular ridges extending away the drum surface. The drum tester uses a cylindrical casing which fits around the outside of the drum.

The Filler U.S. Pat. No. 3,930,401, entitled "Container and Leak-Testing System Therefor", provides a system for testing opening equipped containers for leakage during the entire period, which is usually relatively long, between the time that such containers are fabricated by the manufacturer thereof and the time that they are filled by the user with the product intended therefor. The system includes a testing method, a particular test closure or cap and structural relationship thereof with a container opening, and apparatus for establishing a pressure differential between the interior and exterior of any container under test. In the practice of such system, a pressure differential is established between the interior and exterior of the container, such as by vacuuming the container interior; seating a closure cap of particular character against surfaces of the container in covering relation with the opening thereof, and sealingly relating the closure cap to the container and thereafter maintaining the sealing relationship therebetween using, in each instance, only the pressure differential as the seating and sealing force; transporting the sealed container from its place of fabrication to the place of use, either directly or with intermediate storage periods; band before the container is to be filled with a product, testing the tightness of the closure cap against the container as an index of the presence or loss of the pressure differential.

The Hass et al. U.S. Pat. No. 3,987,664, entitled "Dry-Testing System For Detecting Leaks In Containers", provides a leak detection system capable of efficiently dry-testing containers such as steel drums of large capacity. The system includes a test station constituted by a hermetically-sealed chamber adapted to receive a container to be tested and provided with a retractable head coupled to an external fill assembly. The head functions to sealably engage the bung hole or other container opening and to fill the container with pressurized air, the pressure within the container being maintained during the test period at a constant level, whereby physical distortion of the container is controlled. The pressure within the test chamber is sensed and the output of the sensor is applied to a data processor wherein the influence of temperature on the test chamber pressure is discounted by means of a waveform scanning technique, making it possible to determine the extent to which the container under test is heated and to predict the error pressure in the chamber due to thermal effects. The data processor yields an output signal indicative of the container condition and independent of thermal effects.

U.S. Pat. No. 4,686,850, entitled "Method And Apparatus For Testing Drums", is an earlier of the Applicant herein. In the Evans '850 patent there is provided a method and apparatus for testing drums such as steel drums, wherein the drums are moved automatically into a pre-determined area, and the drums are rotated and oriented, air under pressure is next introduced into the drums, and wherein after an operator observes the drums for leaks, the drums are mechanically lifted from a water filled area. This testing device has not the capability to test beyond about 7 p.s.i, namely, the pressure at which the drum ends bulge or deform.

The McDaniel U.S. Pat. No. 4,747,298, entitled "Container Leak Detector", provides a container testing apparatus and method for detecting leaks in containers such as at the rims of the container. Preferred apparatus have opposing testing heads with receptacles for receiving ends of a container. Each testing head has two seals. A first or end seal is preferably adapted to seal at the end wall of the container. The second or perimetric seal is expandable against the sidewall of the container. The perimetric seal has an internal expansion chamber which is pressurized to expand the seal into sealing engagement with the container. A differentially pressurized testing fluid is transmitting to a chamber formed between the seals and the container. A detector selectively senses changes in the container associated with the existence of a leak through which the differential pressure of the testing fluid is communicated.

SUMMARY OF THE PRESENT INVENTION

The present invention provides a drum testing apparatus which can simultaneously test multiple areas that are susceptible to leakage in a drum, for example, the bottom chine, the sidewall vertical chine, the top chine, the threaded openings, and additionally, the wall integrity of a thin wall metal drum. It also provides a unique method of immersing the entire top portion of the drum including additionally the top chine enabling a very accurate, easily observed check of the entire area including the flanges inserted in the top of the drum. Testing of these flanges is most important since the most commonly used flange contains a rubber gasket that is very vunerable to very slight leaks, and particularly when the gasket, designed for a maximum of 400° F. temperature, is lined and subjected to 450° F. curing by baking.

The testing apparatus of the present invention can be used as a method of detecting cold welds, tight laminations and other similar defects in the steel if it is used before other forms of testing not having this capability. The system of the present invention relates primarily to high pressure testing, in excess of ten (10) p.s.i. which is the normal maximum pressure or differential pressure used in other forms of testing. Preferably the testing apparatus of the present invention functions in a pressure range of 30-150 p.s.i.

The testing apparatus of the present invention can subject the entire drum to pressures greatly in excess of the normal 7 p.s.i. test, pressure even up to 150 p.s.i. without blowing out entirely or even distorting the flat ends of the drums, because the ends are confined during testing by a mechanism such as a hydraulic cylinder or mechanical method such as a toggle screw or rack and pinion. This method and apparatus, which is a unique feature of the Evans tester, enables a predetermined amount of moderate pressure to be applied to the drum prior to pressurizing it. This predetermined pressure does not distort the drum but is so designed that it holds the ends in place and resists outward movement of the ends even under the tremendous end pressure that builds up as the drums are pressurized to those higher air pressures. In this fashion, the damage or bulging that would occur to the ends of drums at high pressure is eliminated. The limits to the amount of pressure that the drum can be subjected to is governed only by the cylindrical body of the drum, not by the flat ends which are vulnerable to pressure and are totally confined. As an example, the upper limits of a standard 18 gauge drum cylindrical body is approximately 200 p.s.i.

The apparatus includes a frame for supporting the drum to be tested. A turntable moveably supported by the frame has a rotatable surface for supporting and turning the drum. Means are provided for immersing the drum bottom chine during testing and while the turntable base rotates the drum. A liquid spray simultaneously immerses the drum sidewall during testing and while the drum rotates. A holder includes a spaced-apart portion which engages respectively the top portion and bottom portions of the drum for supporting the drum end portions during testing. The holder has the unique ability to hold the drum, and the lance for filling the drum, with air at a predetermined controlled normal pressure that will not damage the unpressurized drum, lance, gasket or flange. As the pressure builds up, the force on the lance increases proportionally by using the air cylinder incorporated in it. Additionally, the unique holding mechanism confining the ends prevents the holding mechanism from opening or receding as the pressure within the drum tries to force the holding mechanism on the ends its supports apart. This feature prevents the flat circular ends of the drum from blowing out, distorting, or bulging as long as the air in the drum exceeds approximately 7 p.s.i. A fluid pressure source pressurizes the drum interior during testing at high pressures, such as in excess of fifty (50) p.s.i.

In the preferred embodiment, the turntable base is a generally circular turntable that includes a central supporting shaft defining a center of rotation for the drum during testing.

In the preferred embodiment, the holding means includes an immersable portion that is positioned to immerse the bottom chine of the drum during testing.

In the preferred embodiment, the holding means includes a spring which is associated with the immersing means for supporting the bottom end portion of the drum during testing, the spring deflecting during testing so that pressure exerted by the springs at least partially loads at least one end portion of the drum.

In the preferred embodiment, the frame supports the drum in a generally upright, preferably vertical position during testing.

In the preferred embodiment, the immersing means includes a reservoir which holds the bottom end portion of the drum at the bottom chine during testing, immersing the bottom chine during testing.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIGS. 1A-1C are elevational views illustrating the preferred embodiment of the apparatus of the present invention;

FIG. 4 is a side elevational view of the preferred embodiment of the apparatus of the present invention illustrating the spray arms and drum transfer mechanism;

FIG. 5 is a top plan view of the preferred embodiment of the apparatus of the present invention illustrating the spray arms and drum transfer mechanism;

FIG. 6 is a plan view illustrating a multi-station drum testing assembly line as used with the method of the present invention;

DETAILED DESCRIPTION OF THE PREFERRED EMBODIMENT

Figure 1A:
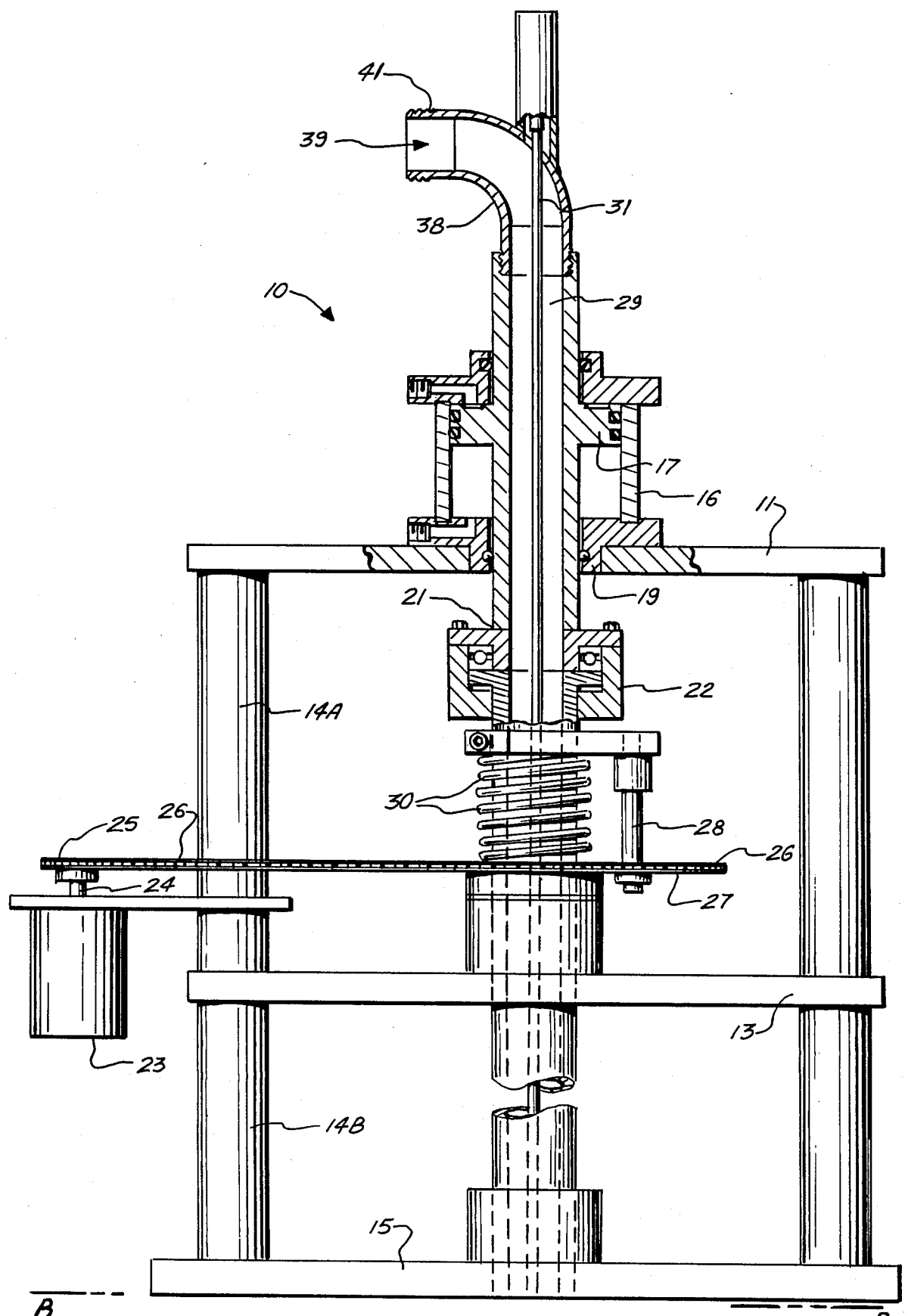
Figure 1C:
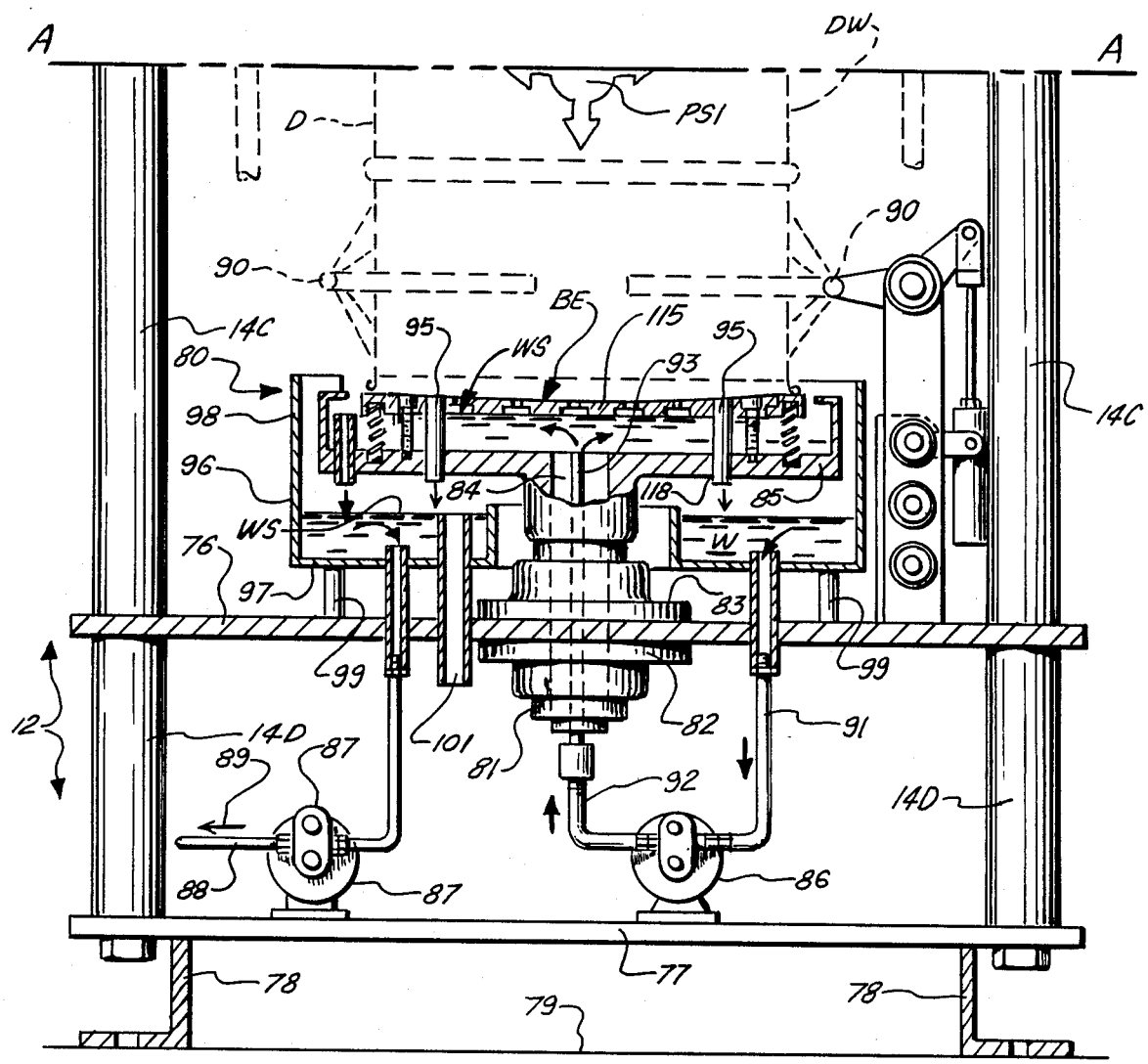

FIGS. 1A–1C illustrate generally the preferred embodiment of the apparatus of the present invention designated generally by the numeral 10.

In FIG. 1A, there is seen the uppermost portion of the drum testing apparatus 10, while FIG. 1B shows the central portion of the drum testing apparatus, while FIG. 1C shows the lowermost portion thereof. It should be understood that FIGS. 1A, 1B, and 1C match together so that the uppermost FIG. 1B registers upon the central FIG. 1B which match lines at AA with the lowermost FIG. 1B. In FIGS. 1A–1C, testing apparatus 10 includes a frame 12 which can be, for example, a plurality of upstanding posts 14 connected at the uppermost portion at top transverse plate 11 and a transverse plate 13. Posts 14 include uppermost posts 14A which extend between transverse plates 11 and 13, while lowermost posts 14B extend between plates 13 and 15 (see FIG. 1B). Plate 11 supports a hydraulic cylinder 16 having a moveable pushrod portion 17 which moves downwardly for operating an elongated tubular stem 18 downwardly. The stem 18 supports an uppermost test head assembly 20 (FIG. 1B) which engages the top of a drum D to be pressure tested (phantom lines in FIG. 1B) as will be described more fully hereinafter.

Hydraulic cylinder 16 communicates at its lower end portion 19 via sleeve 21 with a rotary bearing assembly 22. Thus, the hydraulic cylinder 16 does not rotate while the stem 18 below bearing 22 rotates. This allows the stem 18 to rotate and the test head assembly 20 to rotate therewith during pressure testing of drum D. This rotation is desirable because it allows the drum D to be fully rotated 360° during the testing procedure, so that an operator standing in a fixed position can view the entire drum outer surface as it rotates, thus checking the full 360° outer wall of the drum for leaks. Such an inspection includes of course an observation for any leaks of the drum outer wall, the drum vertical seam, the annular top chine of the drum, and the annular bottom chine of the drum and both drum ends. With the present invention, a singular operator can thus simultaneously check all of the critical areas of the drum for leaks with the apparatus 10 of the present invention.

A motor drive 23 includes a drive shaft 24 and a sprocket 25 which engages chain 26. Chain 26 similarly registers with sprocket 27 forming a part of gear reduction mechanism 28 for producing a desired r.p.m. for stem 18 and upper test had assembly 20. Spring 30 aids in returning the moveable pushrod 17 portion of hydraulic cylinder 16 to an uppermost position when the hydraulic pressure source supplied to hydraulic cylinder 16 is released, such as at the end of each pressure test of the drum D, and holds a guide sprocket (not shown) that meshes with spring 26. Tubular stem 18 includes a central bore 29 for supplying pressurized gas to the apparatus 10 for testing purposes. Note from an inspection of FIGS. 1A and 1B that the pressure supplied from a source of compressed air, for example, can be routed to either the drum testing lance assembly 40, or to water removal ports 45, which includes a plurality of radially spaced-apart transverse ports which can channel air laterally in the direction of arrows 45A for removal of water from the top of the drum D after a testing procedure has been completed. A valve assembly 31 can be used to alternately channel a pressurized air to ports 45 or to lance assembly 40.

In FIG. 1B, bore 29 communicates with diagonal lance bore 35–37 for supplying fluid laterally and downwardly to lance assembly 40. Notice that valve assembly 31 includes a rod portion 32 having a lowermost valve member 33 that seats upon valve seat 34. Diagonal bore section includes, for example, an uppermost section 35 and a lowermost section 36 which are connected together by means of flexible section 37 which can be, for example, a rubber-like or plastic corrugated material that allows for some adjustment in the position of lance assembly 40 with respect to stem 18.

During operation, the valve stem 32 moves upwardly and downwardly between an uppermost position, as shown in FIG. 1B, to a lowermost position which seals the valving member 33 upon the seat 34. In the lowermost sealed position, air can be channeled via bore 29 to lateral bore 32 so that test fluid can be supplied to lance assembly 40. A 45° elbow 38 communicates with bore 29 and provides a laterally extending bore 39. The elbow 38 has a threaded outer end portion 41 for attaching a source of pressurized fluid thereto for testing purposes.

Stem 18 forms a threadable connection 42 with test head hub 43. Hub 43 provides a continuation of bore 29 which communicates at its lower end portion with ports 45 so that pressurized air supplied to bore 29 can be used to blow air laterally through ports 45, as shown by the arrows 45A in FIG. 1B. Hub 43 forms a threadable connection with yoke 44 which carries plug assembly 46 and lance assembly 40. Plug assembly 46 provides a lowermost end portion 47 that seals the smaller diameter opening typically provided on most common 55-gallon drums. Yoke 44 also carries lance assembly which registers upon the larger drum opening D2.

In the preferred embodiment, the plug assembly 46 simply forms a sealed connection covering the small opening D1 formed in the top or uppermost end of the drum D, while the lance 40 forms a connection with the larger D2 opening in the drum. The connection of the lance 40 to the drum opening D2 is the connection which is used for pressurizing the drum in the preferred embodiment for testing purposes.

Figure 2:
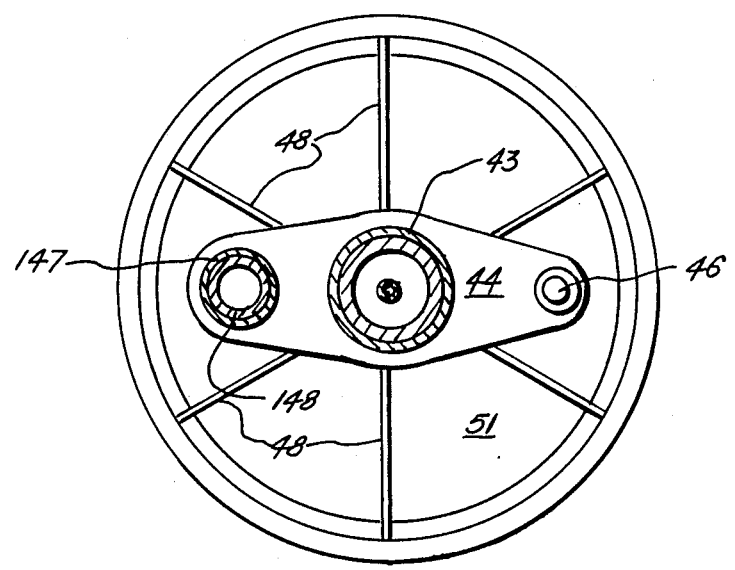
FIG. 2 is a sectional view taken along lines 2—2 of FIG. 1B.

Hub 43 supports a plurality of outwardly and downwardly extending vanes 48 which are radially spaced (see FIG. 2). Each vane 48 has a lower edge surface that conforms to the top surface 51 of drum top end TE, supporting the top end TE during testing. During rotation of the drum D, the speed of rotation of the drum D can be increased rapidly at the end of a test so that the vanes 48 aid in throwing test water W laterally away from central hub 43 and toward circumferentially extending shroud 50.

Hub 43 at its lower end portion 49 abuts drum top end TE during the testing procedure, and (with vanes 48) supports the uppermost surface 51 of the drum top end TE. The vanes 48 extend substantially across the domed or curved surface portion 51 of the drum top end TE.

At least some vanes 48 form a connection at their end portion with an annular side wall 52. Sidewall 52 supports shroud 50 using a plurality of radial struts 53. The annular sidewall 52, struts 53, and circunferentially extending shroud 50 all rotate with hub 43, vanes 48, and yoke 44.

Figure 11:
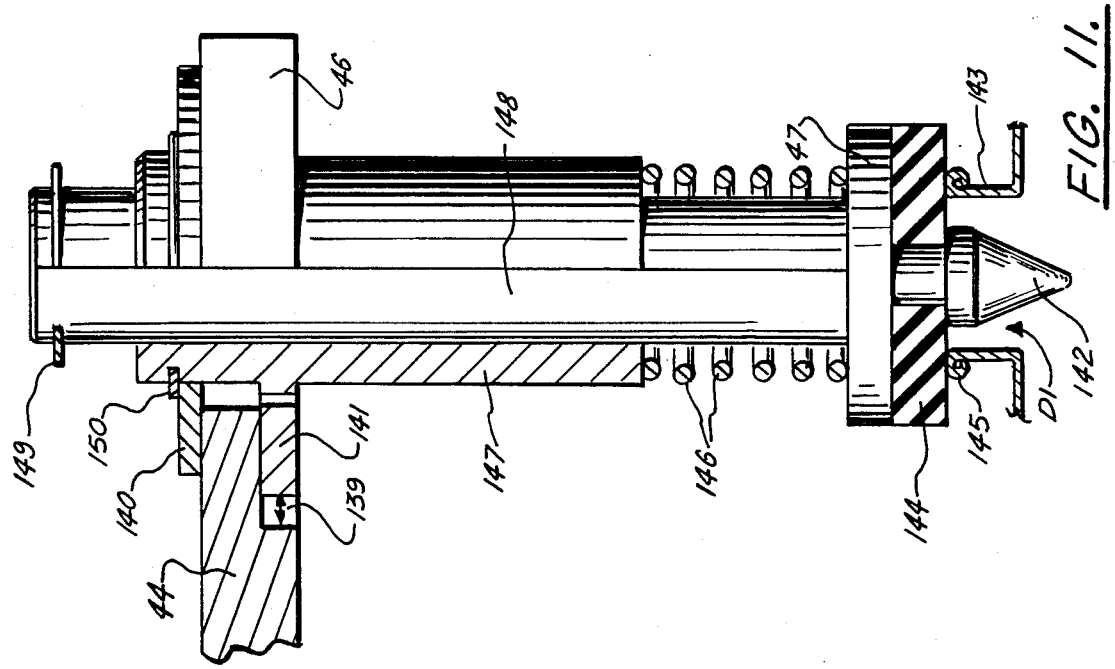
FIG. 11 is a fragmentary elevational view illustrating the closure plug assembly portion of the present invention as used with the upper reservoir testing portion thereof.
Figure 10:
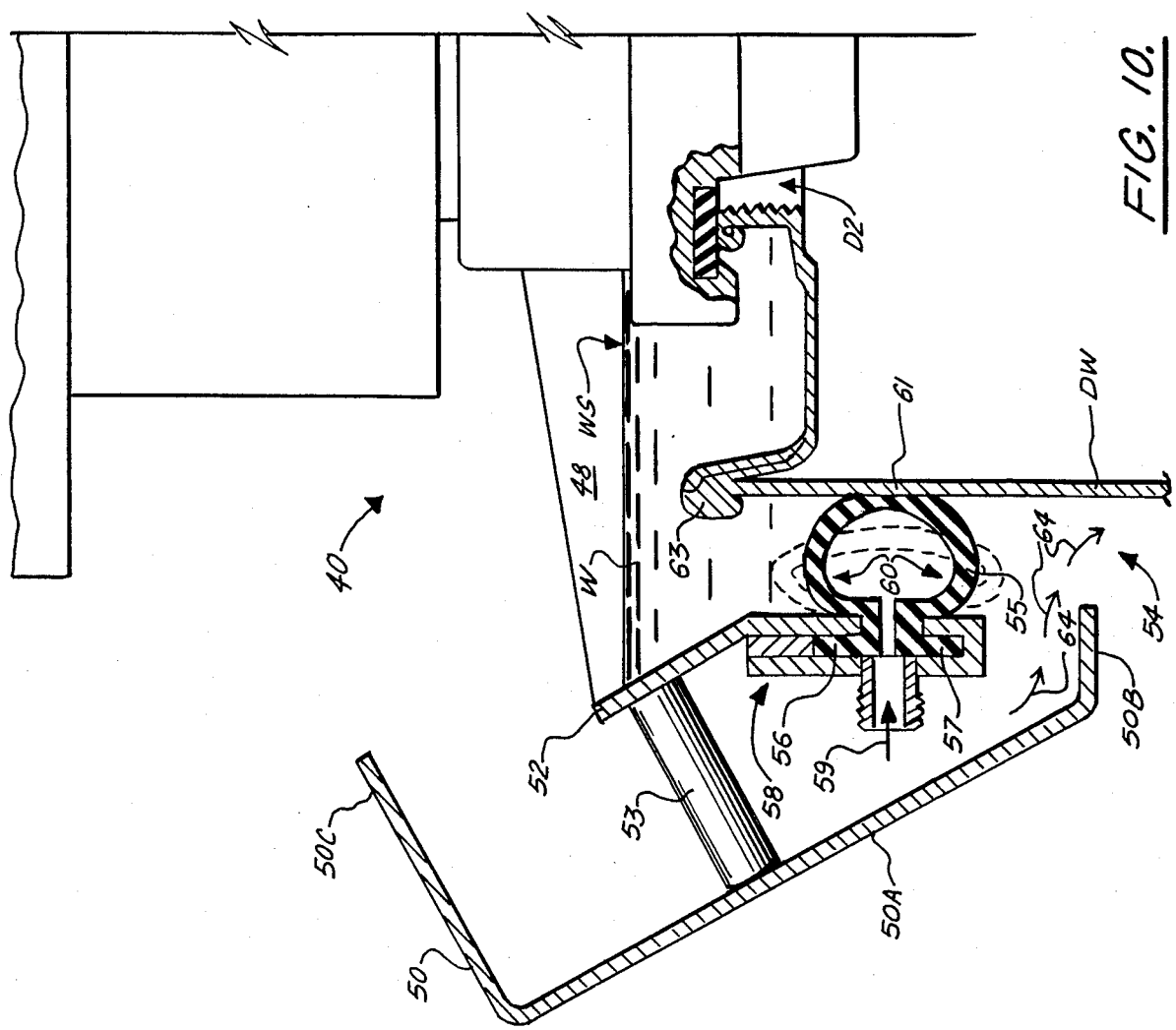
FIG. 10 is a fragmentary elevational view illustrating the inflatable seal portion of the present invention.

The lowermost end portion of curved sidewall 52 carries an annular seal assembly 54 that includes an inflatable portion 55 (see FIG. 10). Inflatable portion 55 comprises in the preferred embodiment flexible rubber-like member having end portions 56, 57 which are held by clamp mechanism 58. A conduit 59 supplies air for purposes of inflating the inner space 60 of inflatable annular seal 55. When inflated, annular seal 55 forms a connection with the drum D at 61, as shown in FIG. 10. This allows test water W to be added to the area above inflatable annular seal 55 and inside annular wall 52, to a water level designated by the letters WS in FIG. 10. Thus, the entire top portion of the drum D is covered with water for leak testing purposes, including the upper end portion 62 of the drum sidewall, the uppermost annular chine 63, and the entire area of the drum top end portion TE including the drum threaded openings D1 and D2. An inspection of FIGS. 10 and 11, shows that the lance assembly 40 forms a seal upon the larger drum opening D2, while the plug assembly 46 forms a seal upon the smaller drum opening D1. Test fluid (preferably air under pressure) is injected to the drum interior via opening D2 using lance assembly 40.

Circumferentially extending shroud 50 includes a downwardly inclined portion 50A and a lowermost horizontally extending portion 50B depending therefrom. The uppermost portion thereof shroud 50 includes an upwardly inclined section 50C. The combination of these three sections 50A–50C provides a channel for catching test water W which is discharged from the are above the inflatable annular seal 55, and inside annular sidewall 52. That test water is channeled to the drum sidewall DW so that it can aid the operator in determining any leakage. Thus, a means is provided for using the test water W twice. Firstly, the test water W is used above the inflatable member 55 and inside the annular sidewall 52 (FIG. 10) for testing the entire top portion of the drum including the top end TE, the fittings at openings D1, D2, the top chine 63, and the top end portion 61 of the drum sidewall DW.

When the test is completed, the stem 18 and hub 43 are rotated at an increased speed which creates a centrifugal force that evacuates the test water W from the position shown in FIG. 10, and slings that water in a radial direction away from the hub 43 and toward the shroud 50. The shroud 50 then channels the discharged water downwardly and inwardly so that it exits section 50B of shroud 50 and hits the drum sidewall DW, as shown by the arrows 64 in FIG. 10. This aids the operator in viewing the sidewall DW of the drum for determining leaks which occur in the vertical chine or vertical weld, and in locating any imperfections or laminations in the drum will DW itself.

Figure 1D:
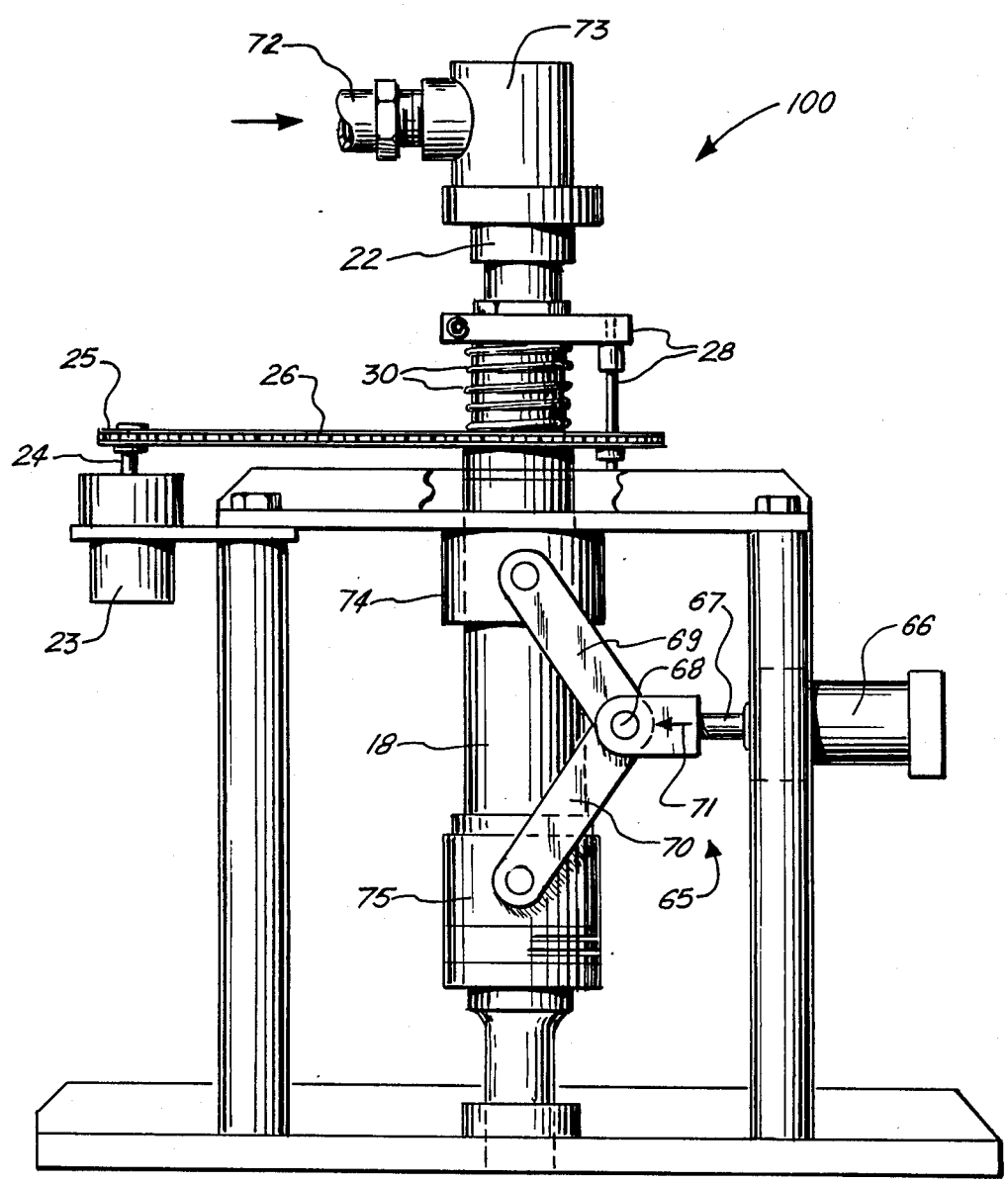
FIG. 1D is an elevational fragmentary view of an alternate embodiment of the apparatus of the present invention.

While the embodiment of 1A–1C illustrates the preferred embodiment using a hydraulic cylinder 16, an alternate construction 100 is shown in FIG. 1D using a toggle mechanism 65. Toggle 65 includes a cylinder 66 which communicates with an extensible pushrod 67 for moving a pivotal connection 68 inwardly and outwardly. Pivotal connection 68 forms a connection with a pair of links 69, 70. When the cylinder 66 extends the pushrod 67 to an outward position in the direction of arrow 71, the links 69 vertically align, clamping the drum testing head 20 in the downward operative position for the testing of a drum. In the alternate embodiment, stem 18 includes an uppermost air inlet 72 that communicates with 90° preferably rotary-type rotating swivel flow fitting 73 so that test fluid can enter the bore 29 for the purposes of testing a drum D. The construction of apparatus of 100 would be similar as relates to the drum testing head assembly 20, as aforedescribed with respect to FIG. 1B. The links 69, 70 however, connect with a pair of spaced-apart thrust bearings 74, 75 so that the stem 18 can rotate inside the thrust bearings 74, 75 and with respect to the toggle mechanism 65.

Figure 3:
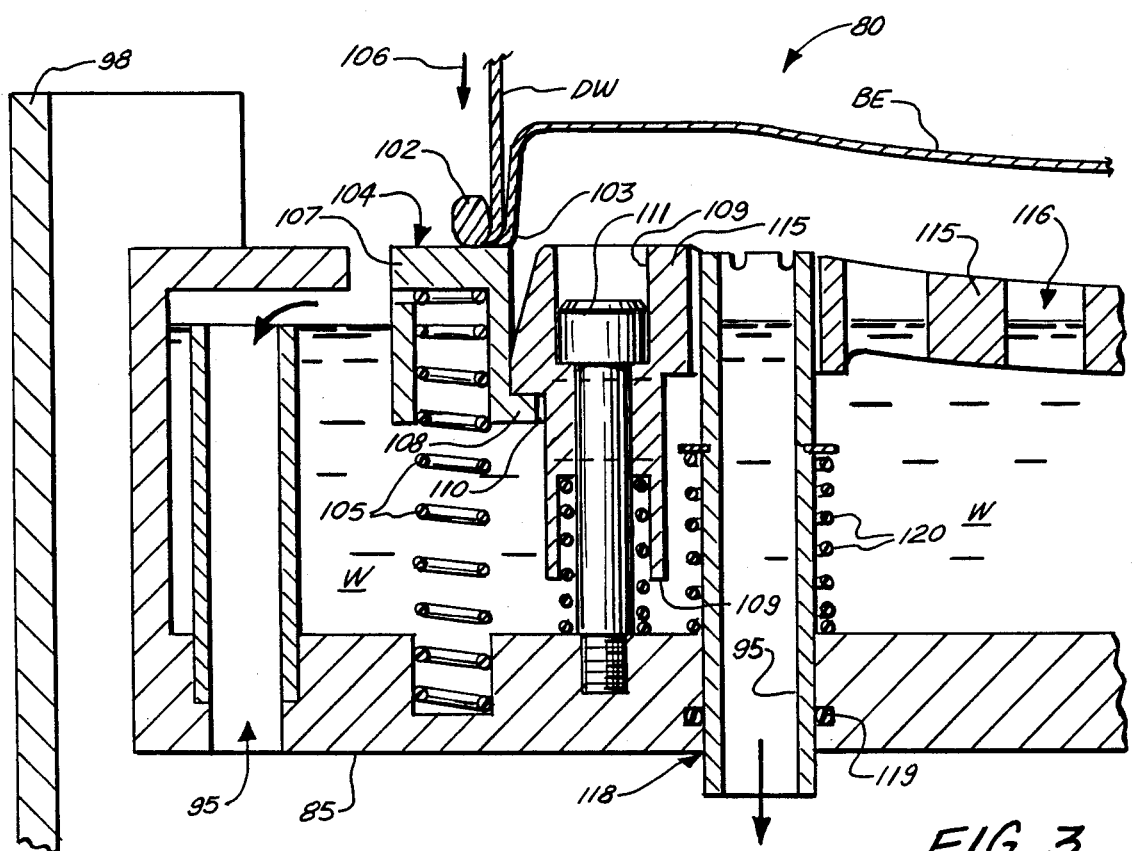
FIGS. 3-3A are fragmentary elevational views of the preferred embodiment of the apparatus of the present invention.
Figure 3A:
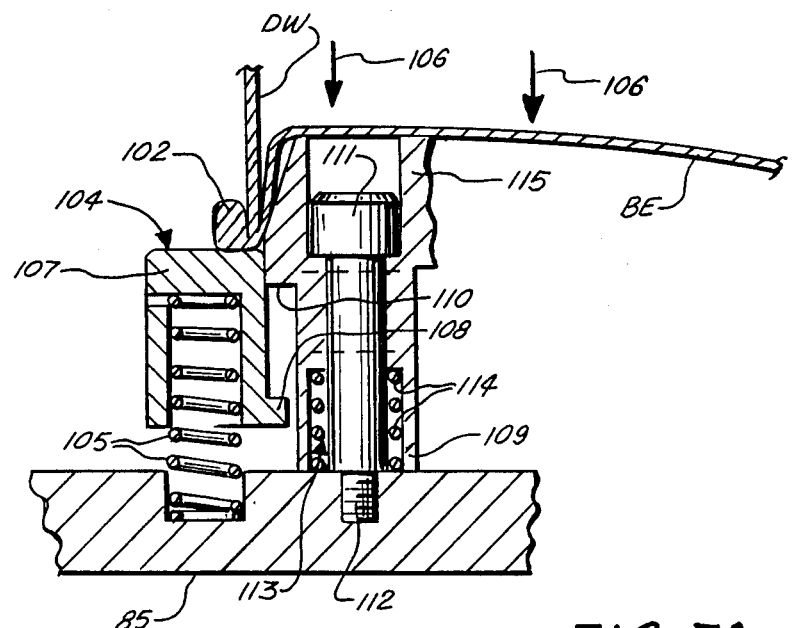

FIG. 1C, 3 and 3A illustrate the lowermost portion of the preferred embodiment of apparatus 10 of the present invention, and including more particularly the bottom test assembly 80, which is used to test the bottom end BE portion of the drum as well as the bottom chine, and the lowermost sidewall portion of the drum. As with the upper test head assembly 20, the bottom test assembly rotates and with the drum D during testing so that an operator or inspector positioned in a single fixed position can view a 360° test of the drum from the single fixed position.

In FIG. 1C, the plurality of columns 14 includes column portions 14C which rest upon transverse plate 76 and column portions 14D which rest upon transverse plate 77. A machine base 78 is provided for anchoring the entire apparatus 10 to an underlying support 79, such as, for example, concrete floor, structural steel pad, or the like.

Transverse plate 76 supports an idler bearing 81 that includes outer fixed portions 82, 83, and an inner rotating shaft portion 84 that rotates with pan 85. Pan 85 is in the form of a circular rotating pan which holds water and rotates with shaft 84 during the testing procedure.

In the preferred embodiment, the power for rotating the drum D is supplied as aforementioned by motor M. Idler bearing 81 simply rotatably supports shaft 84 and pan 85 so that they are free to rotate 360° during the testing procedure. As can be seen by an inspection of FIG. 1C, the lower end portion of drum D is supported upon bottom test assembly 80 and rotates therewith. Pump 86 is a recirculating pump which constantly recirculates fluid to the bottom test assembly 80. Pump 87 is a spray water supply pump which supplies test water via conduit 88 to arcuate spray arms 90. The arrow 89 in FIG. 1C designates schematically the discharge of water from pump 87 toward spray arms 90, though a complete connection of the fluid line from pump 87 to spray arms 90 is not shown. Water is transmitted from pump 87 to spray arms 90 by a hose, conduit, or other suitable means.

Pump 86 receives influent water via overflow line 91. Pump 86 communicates with discharge line for supplying water upwardly via conduit 93 to pan 85. Pan 85 is thus constantly being refilled via conduit 93. Overflow drain 101 regulates the water surface WS in reservoir 96.

Overflow drains 95 allow test water W to flow from pan 85 downwardly into reservoir 96. Reservoir 96 includes a circular bottom 97 and a curved sidewall 98. A plurality of supports 99 hold reservoir in a fixed position upon plate 76. Reservoir 96 would preferably be continuously replenished with test water W from a source (not shown), such as water supply line adjacent the apparatus 10. Reservoir 96 thus provides test water W for both the spray arms 90 and bottom test assembly 80. Drain 101 can be used to control the level of water W contained in reservoir 96.

FIGS. 3 and 3A illustrate more particularly the construction of bottom test assembly 80. In FIG. 3, reservoir sidewall 98 is illustrated as circumferentially extending about pan 85. Pan 85 includes one or more radially-spaced drain lines 95 which determine the water surface WS level of test water W contained in pan 85. Pan 85 tests the bottom end BE of drum D, the lowermost end portion of the drum wall DW, and the bottom chine 102 of the drum wall DW. When the bottom end 103 of the drum wall DW abuts surface 104, spring 105 must be overcome with downwardly applied force, i.e., force applied in the direction of arrow 106. This force is applied by the upper test assembly 20 which is activated by means of hydraulic cylinder 16 or toggle mechanism 65. The surface 104 is thus forced downwardly using drum D so that the lowermost end portion of the drum D, including the drum bottom end BE, the bottom chine 102, and the bottom end portion 103 of the drum wall DW are all submerged below the water surface WS in pan 85.

The surface 104 is an upper surface of annular moving plate member 107, which is shown in an uppermost pre-test position in FIG. 3, and in a depressed testing position in FIG. 3A. Annular plate 107 is supported at annular rib 108 by generally circular plate 115 which provides a corresponding annular shoulder 110 that communicates with and abuts the shoulder 108 in the upper position (see FIG. 3). Plate 115 carries a plurality of sleeves 109 with assembly bolts 111 therethrough that are threadably attached to pan 85, as shown in FIGS. 3 and 3A, at threaded connection 112. Each sleeve 109 features an open bottom portion 113 carrying spring 114. Spring 114 returns the sleeve 109 to an uppermost position (FIG. 3) when testing is completed. Notice in FIG. 3A that the sleeve 109 "bottoms" when downward force, illustrated by the arrows 106, moves the drum D to a lowermost "test" position.

The bottom end BE of the drum D is supported by support plate 115 which is dished to register with drum bottom end BE, and provides a plurality of spaced openings 116 therein. Water W can pass freely through the plate 115 opening 116 during testing so that the bottom end BE of the drum will be fully submerged during the test procedure. Air and water can also discharge via drain line 96. The plate 115 conforms to and supports the drum bottom end BE during high pressure testing to prevent damage to the bottom end BE of the drum when high pressure, such as, for example, 10–100 p.s.i. are used. A plurality of radially spaced drain lines 96 aid in removing excess air and water from the pan 85 during testing. Drain lines 95 penetrate pan 85 at openings 118 with an annular seal 119 preventing leakage. Springs 120 returns each drain lines 96 to an uppermost position after drum pressure testing is completed.

Figure 12:
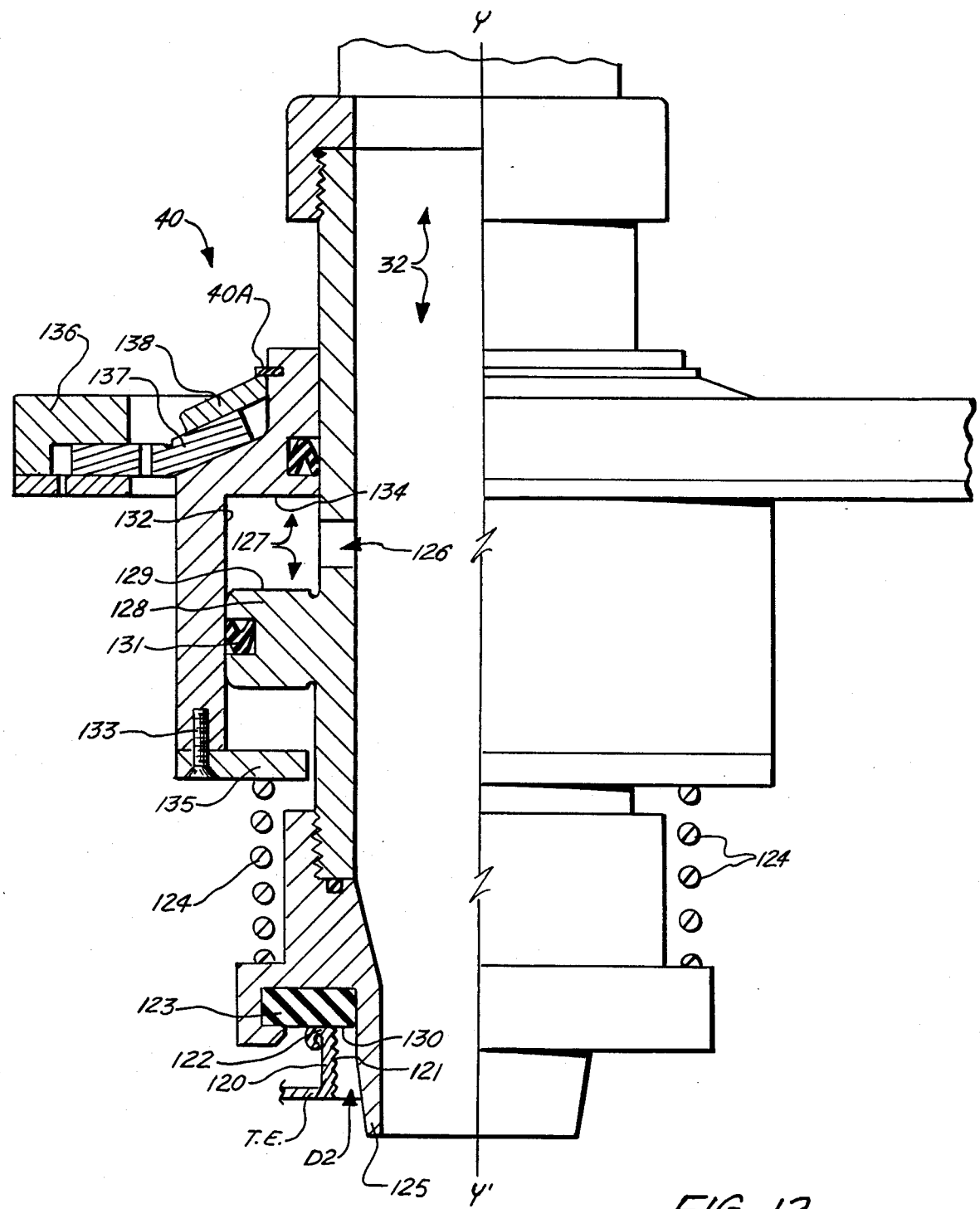
FIG. 12 is a fragmentary elevational view illustrating the lance portion of the present invention.

A seal mechanism is provided for preventing inadvertent leakage of air from the drum during testing through the lance 40. FIG. 12 shows more particularly, the construction of the improved seal mechanism associated with lance assembly 40. The seal mechanism self-compensates to prevent any leakage from the drum D during the pressure testing procedure. As aforedescribed, the lance assembly 40 attaches to the top end TE of drum D at the larger annular threaded fitting defining opening D2.

In FIG. 12, there can be seen an attachment of the lance assembly to drum opening D2. The opening D2 is defined by an annular fitting 120 which is threaded internally at 121. This internal threaded portion defines an opening to which a threaded closure fitting (not shown) can be attached. An upper portion 122 is engaged by rubber seal 123 during the pressure testing procedure. A spring 124 urges the rubber seal 123 downwardly upon the upper surface 122 to preliminarily perfect a seal. This is important because the initial weight of the upper test head assembly 20 in combination with the spring 124 urges the rubber seal downwardly upon the surface 122, preventing any initial leakage when the pressurized air is added to the drum interior via the lance bore 32.

Air is added to the drum interior at lance outlet 125, supplied thereto via bore 32 which communicates with, and is a continuation of the diagonal lance bore 35–37. Transverse port 126 allows pressurized air to enter the chamber space 127 above annular shoulder 128. The surface area of opening D2 is smaller than the surface area of shoulder surface 129. Thus a greater pressure is applied upon shoulder surface at surface 128 then the pressure upon surface 130 which is the outer sealing surface of rubber seal 123. Thus, once the apparatus is fully pressurized, the force pushing down upon the lance to perfect a seal exceeds the force of pressurized test gas trying to escape from the drum D at rubber seal 123, and more particularly at sealing surface 130.

Annular shoulder 128 can be supplied with an annular outer seal 131 for perfecting a seal with the wall 132 of air cylinder wall 133. The air cylinder wall 133 defines the chamber space 127 in combination with a top surface 134 and a bottom surface 135 which are portions of the body 40A of lance assembly 40.

An adjustability about a vertical axis Y—Y is provided for lance assembly 40. The lance body 40A adjustably moves with respect to an annular support flange 136. Plates 137, 138 slide with respect to one another so that a slight angular adjustment of, for example, three degrees (3°) is provided for the axis Y—Y of lance assembly 40 with respect to true vertical. Thus the plates 137, 138 can slide laterally with respect to one another as an adjustment. The plates 137, 138 typically are dished, and have cooperating correspondingly curved surfaces.

A similar adjustment is provided for plug assembly 46 (see FIG. 11). Plug assembly 46 includes a sliding assembly with respect to yoke 44 which includes an adjustability defined by the arrow 139 in FIG. 11. The support plates 140, 141 slide upon yoke 44. The plug assembly 46 features at its lower end portion a centering pin 142 which is conically shaped for aligning the pin 142 in opening D1 defined by fitting annular wall 143. A rubber seal 144 forms a seal upon the uppermost end portion 145 of annular wall 143. Spring 146 urges seal 144 downwardly. Bushing 147 forms a slideable connection with the central shaft 148. Retainer ring 149 holds pin 148 in its slideable position within bushing 147, preventing it from being removed inadvertently. Likewise, bushing 147, plate 140 and plate 141 are held in a position upon yoke 44 by retainer ring 150.

FIGS. 4–6 illustrate the transport mechanism of the present invention. In FIGS. 4 and 5 there are provided elevation and top views respectively of the drum transport mechanism. A plurality of drums D are illustrated showing the top end TE portion of the drum in an uppermost position and the drum bottom end BE in a lowermost position. In FIG. 4, the spray arms 90 are shown in an operative spraying position in hard lines for the "test" and "discharge" positions, and in a retracted inoperative position, rotated 90° away from the drums D in phantom lines. The spray arms also move laterally during transport of the drums. Spray arms 90 are semicircular in shape and include a plurality of small idler wheels 151 mounted thereon which engage the drum. The drums D are removably supported upon a roller conveyor 152 for transport to the test apparatus 10. The drums move between a standby position STBY, as illustrated in the right side of FIG. 4, to a testing position as shown in the central portion of FIG. 4, and then to a left discharge position DIS. Movement of the each drum D between the various positions can be upon roller conveyor 152 from the standby position to the test position as designated by the arrow 153 in FIG. 4.

In order to transport drum D from the standby position STBY to the test position, the spray arms 90 and the attached wheels 151 are rotated to a generally horizontal position as shown in hard lines in FIG. 4 in the central test and left hand discharge DIS positions. The spray arms 90 rotate downwardly ninety degrees (90°) so that the drum idler wheels 151 engage the drums. Once engaged by spray arms 90, the drums D can be moved laterally. The idler wheels 151 allow the drums to rotate with respect to the spray arms 90. Spray arms 90 are mounted for travel slideably with sleeve 158 upon rail 154. Spray arms 90 are moved along rail 154 by means of a plurality of horizontally extending cylinders 155. Each cylinder 155 has an extensible pushrod 155A connected for movement with plate 155B and sleeve 155C which forms a connection at gussets G with sleeve 158. Thus, extension and retraction of pushrod 155A produces a corresponding movement of spray arms 90 so that drums D can be moved between the standby, and testing positions as well as between the testing and discharge positions.

Movement of the spray arms 90 from an uppermost retracted to the lowermost operating (FIGS. 4 and 5) position is by means of a hydraulic cylinder 156 having an extensible pushrod 157 which connects at gusset G to sleeve 158. Extension of pushrod 157 causes link 158 to rotate spray arms 90 to the lower operative position (FIGS. 4 and 5). Retraction of pushrod 157 causes link 158 to rotate arms 90 to an upper retracted position (phantom lines, FIGS. 4 and 5).

In the plan view of FIG. 5, the drums D can be seen moving from left to right. The rail 154 is surrounded by sleeve 158. Spray arms 90 are pivotally connected to sleeve 158 at gusset G and slide upon the rod 154. Spray arms 90 pivotally move with respect to the rod 154 and with sleeve 158. Link 157 forms a connection between spray arm 90, sleeve 158, and cylinder 156.

In FIG. 5, the spray arms 90 are in an operative position for spraying test water, as illustrated by the dotted lines 160 in FIG. 5. This operative position is used to move the drums from the standby, to the testing, to the discharge stations from an "in" position, as illustrated by the arrow 161 in FIG. 5, to an "out" position, as illustrated by the arrow 162.

A schematic view of a typical drum conveyor arrangement for multiple drum testing apparatus 10 is seen in FIG. 6. A drum inflow line 163 supplies a plurality of drums in a conveyor fashion for testing purposes. Three test stations designated by the number 164, 165 and 166 are provided with a central single standby station designated as 167. Drums D would be transported to the standby station 167 and then moved to any one of the three test stations 164, 165, 166. Spray arms 90 would sequentially move each drum as it arrives at standby 167 to a test position 164, 165, 166. After testing is completed, the spray arms would then advance the drums to the discharge stations 168–170 where they are subsequently removed upon roller conveyors 171. A pair of operators can view the drums during pressure testing, as schematically illustrated by the arrows 172, 173 designating both the position of the operators and their line of sight in the direction of arrows 172, 173. The pair of operators 172, 173 can simultaneously observe multiple drums from a single location. Since each testing station 164, 166 provides a rotating drum at which all testing function are performed, a single operator can very quickly conduct multiple pressure tests for leaks on multiple drum areas, including the drum wall, the bottom and top end portions of the drum including the top and bottom chines, the vertical seam or chine of the drum, and the pressure test can also be a high pressure test of, for example, 50–100 p.s.i., not heretofore available for testing thin wall drums.

Figure 7:
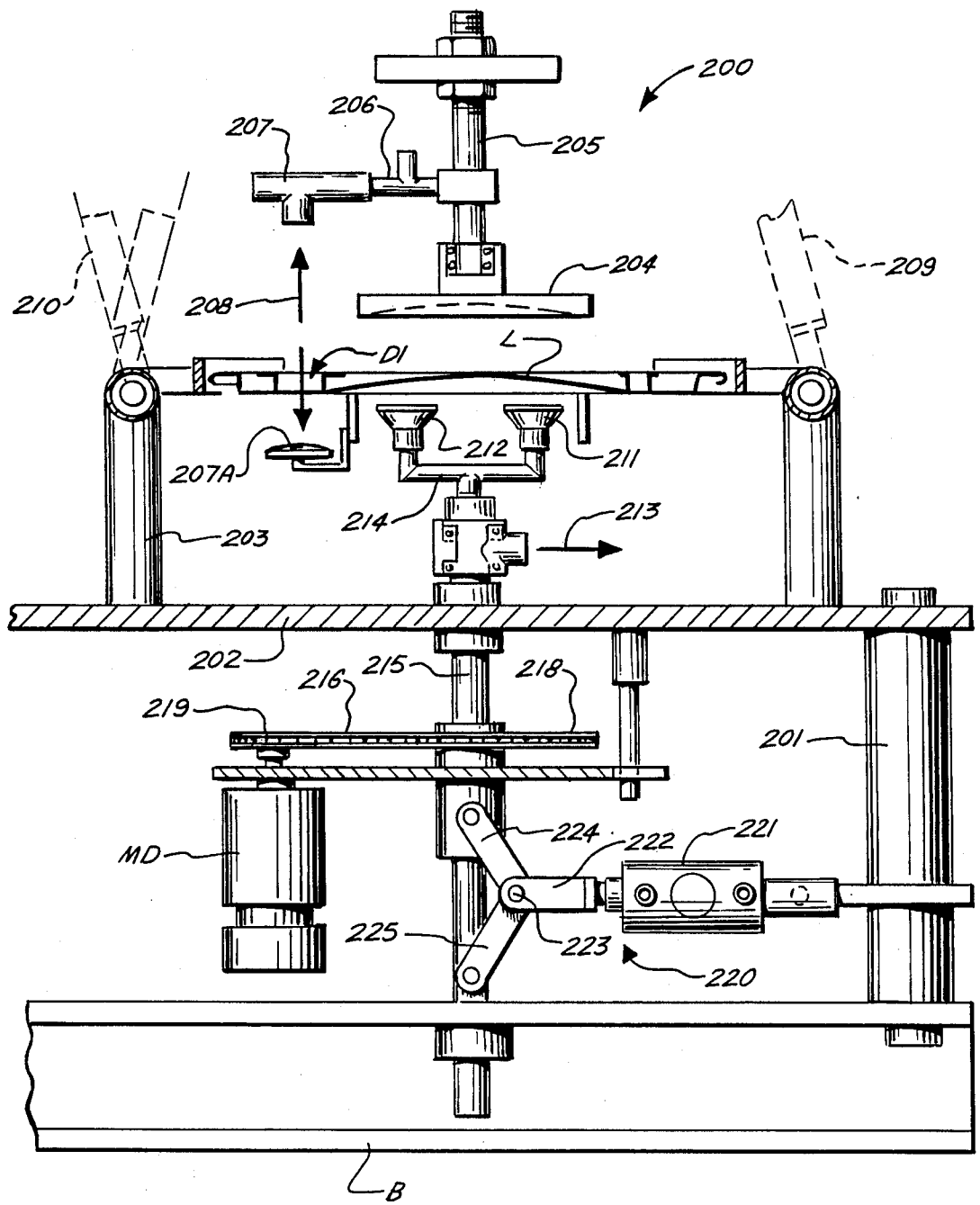
FIGS. 7-8 are elevational views of the preferred embodiment of the apparatus of the present invention illustrating the drum lid portion tester.
Figure 8:
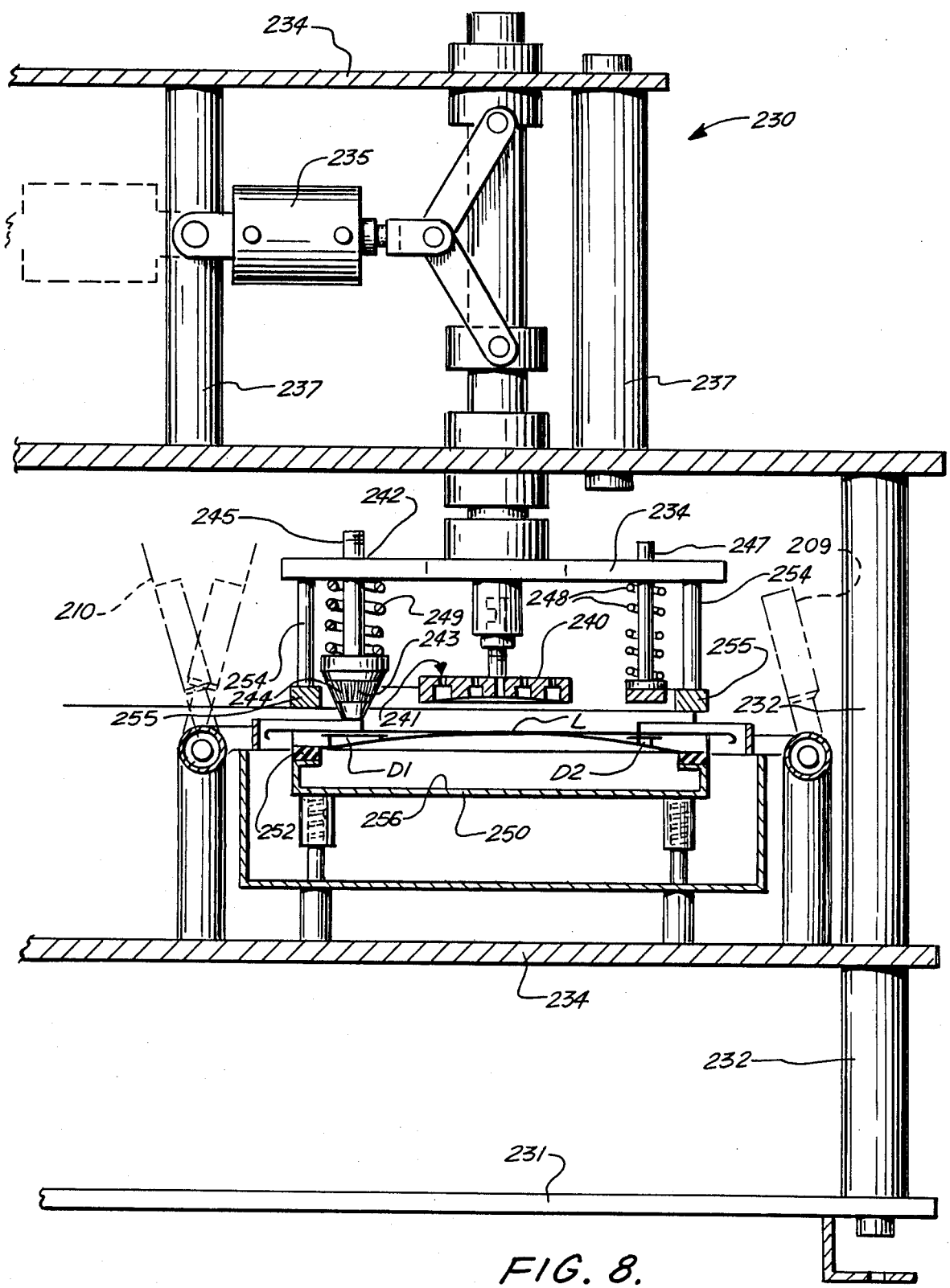

FIG. 7 and 8 illustrate a drum lid tester designated generally by the numeral 200. Drum lid tester 200 includes a structural frame having a base B which supports a plurality of upstanding columns 201. Transverse plate 202 is mounted upon columns 201 and supports a plurality of columns 203. A superstructure (not shown) supports backup plate 204 which depends from post 205. Laterally extending boom 206 supports photoelectric eye 207 used in orientation of the drum lid L. A mirror or other reflective surface 207 provides a target for the photoelectric eye 206, as illustrated by the arrows 208 in FIG. 7. Thus, the photoelectric eye can be used to "index" the drum by "finding" the drum opening D1.

When the drum lid L is properly oriented, enlarged opening D1 aligns with the photoelectric eye along line illustrated by the arrows 208, rotation of the apparatus is stopped and the drum lid is properly indexed. Arms 209 are provided for lifting and moving the drum lid down to a testing station after orientation has been achieved. Suction cups 211, 212 hold the lid during rotation. A source of vacuum, designated by the arrow 213 in FIG. 7, is used to supply vacuum to the suction cups 211, 212 via flowline 214.

Rotation of the suction cups 211, 212 is by means of rotating spindle 215 driven by chain 216 at sprocket 218 which is driven by motor drive MD and sprocket 219. The suction cups 211, 212 are moved upwardly with the spindle 215, for example by means of toggle mechanism 220 which includes an expanding pneumatic cylinder 221, pushrod 222, pivotal connection 223, and a pair of links 224, 225. After the drum lid L is properly indexed, it is moved to a station for testing, which is illustrated in FIG. 7.

The testing station, designated generally by the numeral 230, includes a frame 231 supporting a plurality of columns 232, and transverse plates 234. A toggle mechanism 235 similar to that described with respect to FIG. 7, urges a backup plate 240 downwardly. The plate includes a plurality of openings 241 therethrough so that bubbles evidencing leakage can be seen through the openings 241, if they occur under the test backup plate 240.

The lid test utilizes a spring 249 loaded pneumatic probe 242 having a conically shaped portion 243 with a rubber-like sealing surface 244 that engages the opening D1 in the lid L. An upper threaded end portion 245 can attach to a source of pressurized air for testing leaks.

The opening D2 is sealed with a rubber-like plug seal 246 carried by shaft 247 which is spring-loaded with spring 248. A reservoir 250 holds lid L and the reservoir can contain fluid for immersing the entire lid L during the testing procedure. The area below the lid L and above reservoir floor 252 is normally filled with pressurized air during the test. Water fills the area above lid L and inside the reservoir outer wall. Annular rubber-like seal 252 cooperates with annular shoulder 256 carried by a plurality struts 254 to seal the bottom peripheral edge of lid L to prevent air leakage during the test. The seal is held under force applied by toggle 235.

Figure 9:
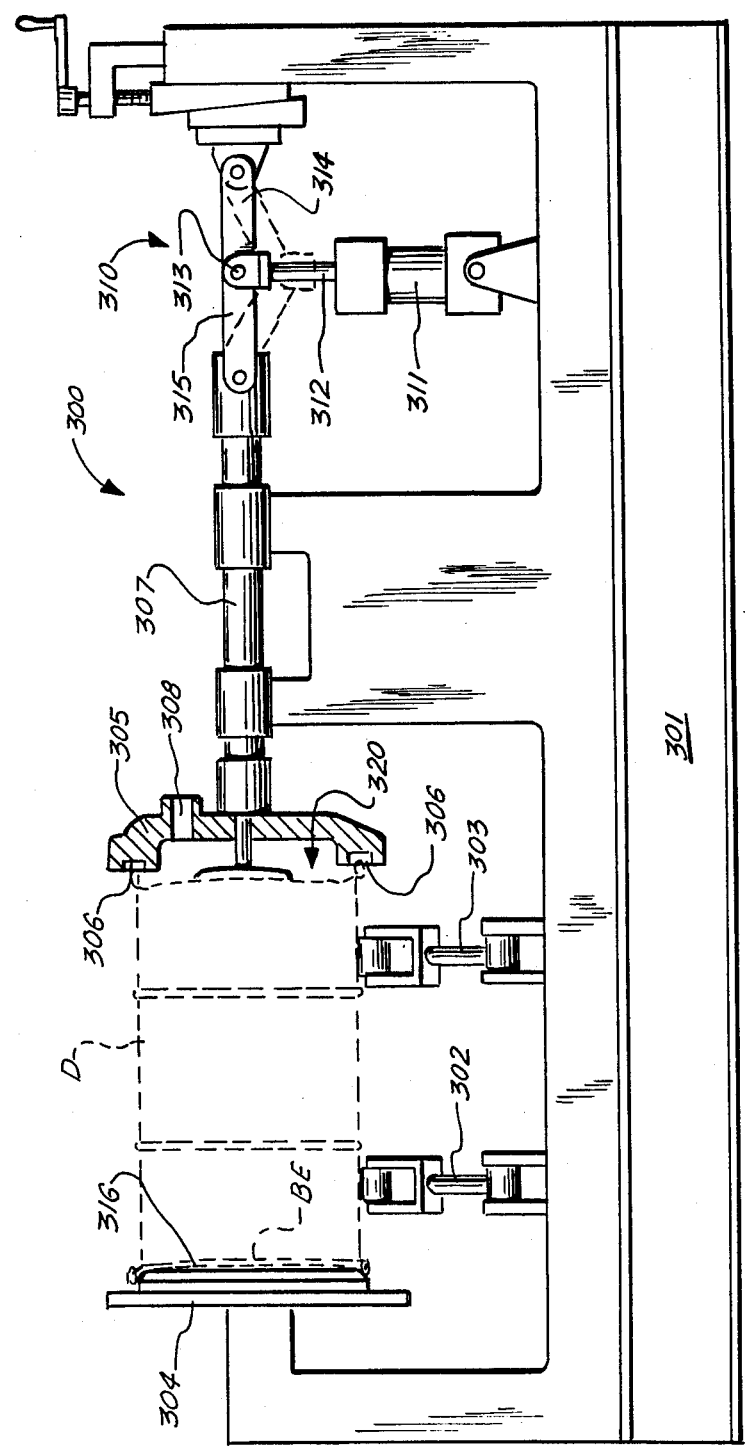
FIG. 9 is an elevational view of a horizontal drum tester that can be used with the method of the present invention.

FIG. 9 illustrates an apparatus presently being used by Evans Cooperage, Inc. and several other drum manufacturers for the testing of drums at low pressures that are calculated not to damage the drum D ends because of bulging. However, in accordance with the method of the present invention, this apparatus could be used for shocking the drum at high pressures of, for example, 50–100 p.s.i. in a short period of time of one to five seconds (preferably less than one second) to reveal cold welds and laminations. The apparatus includes a machine frame 301 having roller supports 302, 303 interfacing with the drum D. The drum D is supported at its end portions by idler plate 304 which is rotatably supported upon the frame 301 and test head 305 which also is rotatably supported upon the frame 301. The test head 305 includes an annular seal 306 for sealing the top end TE of the drum at its periphery. An open area 320 is thus defined inside the seal 306 and within that area between the top of the drum TE and the test head 305 which is filled with pressurized air. The drum D contains an opening in its top (not shown) for allowing pressurized air to enter the drum when the pressurized air is added through the test head 305 at opening 308. A shaft 307 can rotate the test head 305, drum D, and idler 304.

In accordance with the method of the present invention, a drum in this position can be shock tested by quickly pressurizing the drum with a pressure in excess of 10 p.s.i. and preferably on the order of 35–100 p.s.i., in order to test for cold welds, laminations in the drum wall, and other imperfections.

The drum is clamped in operative position by a toggle mechanism 310 which includes a cylinder 311, pushrod 312, pivot 313, links 314, 315. Backup plate 309 prevents the drum lid from deforming under increased pressures in excess of 7 p.s.i. This is important because if pressurizing up to 50–100 p.s.i. for shock testing, the drum lid or top end TE can rupture or damage because pressurized air cannot escape through the drum opening with sufficient speed when the test is completed. Typically, the drum ends, including the top end TE and bottom end BE, can only withstand about 7 p.s.i. Otherwise the drum ends can bulge or rupture. Idler 304 includes a surface 316 shaped to conform to the bottom end BE of drum D to prevent it from rupturing during testing.

In view of the numerous modifications which could be made to the preferred embodiments disclosed herein without departing from the scope or spirit of the present invention, the details herein are to be interpreted as illustrative and not in a limiting sense.

What is claimed as the invention is:

1. A thin wall drum testing apparatus for simultaneously testing the integrity of multiple areas of a drum having a cylindrical side wall and one or more generally flat drum ends comprising:
    (a) a frame for supporting a drum to be tested;
    (b) a turntable base movably supported upon the frame and having a rotatable surface for supporting and turning the drum;
    (c) means for covering multiple areas of the drum with liquid during testing and while the turntable base rotates the drum and including spray means for spraying a portion of the drum with liquid and immersing means for simultaneously immersing a portion of the drum during testing;
    (d) holding means including spaced apart portions engaging respectively the top portion and bottom end portions for supporting the drum end portions during testing; and
    (e) an air pressure source means for pressurizing the drum interior during testing.

2. The apparatus of claim 1, wherein the drum is supported by the frame in an upstanding position.

3. The apparatus of claim 1, wherein the holding means includes structural means conforming to the outer surface of each drum end for preventing bulging of the drum ends during pressure testing of the drum at pressures in excess of ten pounds per square inch (10 p.s.i.).

4. The apparatus of claim 3, further comprising preload means for applying a preload to the drum before pressure testing so that high pressure testing of the drum can be conducted at an internal drum pressure which approaches the pressure limit of the drum cylindrical wall.

5. The apparatus of claim 4, wherein the preload can support the drum ends to a test pressure of at least fifty pounds per square inch (50 p.s.i.).

6. The apparatus of claim 1 wherein one of the drum ends has an opening and the air pressure source means includes lance means sealably connectable to the drum end opening.

7. The apparatus of claim 6, wherein the lance means includes means for preventing leakage during testing at the opening.

8. The apparatus of claim 7, wherein the lance means comprises a body, a source of pressurized air supplied to the body, a dispensing outlet, capable of insertion into a drum end opening of a first cross-sectional area and a cylinder having a pushrod with a cross-sectional surface area for receiving pressurized fluid that is larger than the cross-sectional area of the opening.

9. A method of leak testing thin wall cylindrical drums having a cylindrical sidewall and a pair of generally flat ends connected to the sidewall, at least one of the ends having a fill opening therethrough comprising the steps of:
    (a) preloading the drum at its ends with a pair of opposed supports, each conforming to the surface of a respective drum end;
    (b) filling the drum with pressurized air at the fill opening with a lance that forms a seal with the drum fill opening;
    (c) elevating the drum internal pressure to a test pressure value above the pressure limit of the drum ends when unrestrained from bulging, but less than the unsupported pressure limit of the cylindrical side wall; and
    (d) covering at least a portion of the drum exterior with a liquid in order to inspect the drum for leaks.

10. The method of claim 9, wherein in step "c", the test pressure is in excess of ten pounds per square inch (10 p.s.i.).

11. The method of claim 9, wherein in step "c" the test pressure is in excess of fifty pounds per square inch (50 p.s.i.).

12. The method of claim 9, further comprising the step before "a" of supporting the drum in an upright position.

13. The method of claim 9, wherein in step "d" the drum is at least partially immersed in a reservoir.

14. The method of claim 9, wherein in step "d" the drum is at least partially sprayed with a liquid.

15. The method of claim 9, further comprising the step "e" of rotating the drum during the leak test.

16. The method of claim 12, further comprising the step "e" of rotating the drum during the leak test about a generally vertical axis of rotation.

17. The method of claim 9, wherein in step "d" at least the top end and bottom end portions of the drums are immersed in a reservoir during leak testing.

18. The method of claim 12, wherein in step "d" at least the top end portion of the drum is immersed in a reservoir of test water and there is further provided the step "e" of channeling the reservoir water to the drum wall after the drum top end portion is observed for leaks.

19. The method of claim 9, wherein in step "c" the drum is internally shocked by elevating the drum internal pressure to the test pressure valve in less than ten (10) seconds.

20. A drum testing apparatus for simultaneously testing the bottom chine, sidewall vertical chine, and threaded openings, and the entire wall integrity of a drum comprising:
    (a) a testing frame for supporting a drum to be tested;
    (b) a turntable base movably supported upon the frame and having a rotatable surface for supporting and turning the drum;
    (c) means for immersing the drum bottom chine during testing and while the turntable base rotates the drum;
    (d) means for immersing the drum top chine during testing and while the turntable top rotates the drum;
    (e) a means for immersing the entire top of the drum including the threaded openings while the turntable top rotates the drum;
    (f) liquid spray means for simultaneously immersing the drum side wall and the vertical chine during testing and while the drum rotates;
    (g) holding means including spaced apart portions engaging respectively the top portion and bottom end portions for supporting the drum end portions during testing so that the drum end portions are supported against excessive bulging when the drum interior is pressurized higher than ten pounds per square inch (10 p.s.i.); and
    (h) an air pressure source filling means for pressurizing the drum interior during testing.

21. The apparatus of claim 20, wherein the holding means supports the air pressure source filling means.

22. The apparatus of claim 20, further comprising shocking means for quickly pressurizing the drum interior to locate cold welds and/or metal flaws such as tight laminations.

23. The apparatus of claim 20, wherein shocking means comprises means for supporting the drum ends to prevent bulging during testing, and means for pressurizing the drum interior to a pressure of at least ten pounds per square inch (10 p.s.i.) and within ten seconds.

24. The apparatus of claim 20, further comprising means associated with the frame for holding drums having removable drum heads, during the testing process.

25. The apparatus of claim 20, wherein the turntable base is generally circular and includes a central supporting shaft defining a center of rotation for the drum during testing.

26. The apparatus of claim 20, wherein the holding means includes an immersible portion that is positioned to immerse the bottom chine during testing.

27. The apparatus of the claim 20, wherein the holding means includes spring means associated with the immersing means, for supporting the bottom end portion of the drum during testing, the springs deflecting during the testing procedure so that pressure exerted by the springs at least partially loads at least one end portion of the drum.

28. The apparatus of claim 20, further comprising multiple drum support means in close proximity to the testing frame for supporting a plurality of drums adjacent the frame in separate spaced-apart positions, and means for quickly moving a plurality of the drums to and from the testing frame.

29. The apparatus of claim 20, further comprising clamp means that includes in part the liquid spray means for holding the drum in a fixed position upon the frame against lateral movement of the drum when the drum is in a testing position upon the frame.

30. The apparatus of claim 24, wherein the frame includes multiple stations for simultaneously supporting a plurality of drums upon the frame and there is further provided a plurality of clamps associated with the spray arm means for gripping the drum, and means for advancing the drum from one position upon the frame to a second position upon the frame.

31. The apparatus of claim 20 wherein the liquid spray means comprises one or more generally semi-circular spray arms.

32. The apparatus of claim 20, wherein the liquid spray means comprises a pair of opposed arms that are positioned on generally opposite sides of the drum during testing.

33. The apparatus of claim 20, wherein the liquid spray means comprises a pair of semi-circular arms disposed during testing on generally opposite sides of the drum and including means for clamping the drum between the spray arms.

34. The apparatus of claim 20, further comprising multiple stations for supporting a plurality of drums upon the frame, and runway means supported by the frame for moveably advancing a drum being tested between two stations which are separate and apart from one another.

35. The apparatus of claim 20, wherein there is further provided a plurality of separate stations upon the frame simultaneously for supporting a plurality of drums upon the frame, a runway for moving drums along the frame and between the stations, and drive means for advancing a drum from one station to the next station.

36. The apparatus of claim 35, wherein the drive means comprises at least one expandable cylinder.

37. The apparatus of claim 20, wherein the holding means comprises a pair of spaced-apart circular flanges positioned to abut the upper and lower respective end portions of the drum, holding the drum therebetween.

38. The apparatus of claim 20, wherein the holding means includes a pair of spaced-apart flanged portions which are positioned to abut and conform to the opposite end portions of the drum, and at least one of the flanged portions is moveable with respect to the other flanged portion, and further comprising powered means for urging one flanged portion toward the other flanged portion, holding the drum therebetween with a preload prior to pressure testing.

39. The apparatus of claim 20, wherein the holding means comprises an upper and lower respective spaced-apart flanges, the lower flange being rotatably powered to rotate the drum.

40. The apparatus of claim 20, wherein the reservoir means comprises a lowermost reservoir carried by the frame and extending upwardly a distance, and including a sidewall portion that contains water, the sidewall being positioned to extend above the lowermost surface of the drum during testing so that water contained in the reservoir covers at least the bottom end portion of the drum during testing.

41. The apparatus of claim 20, further comprising an uppermost reservoir for immersing the top portion of the drum, including at least the top chines during testing.

42. The apparatus of claim 20, wherein the liquid spray means comprises a substantially semi-circular spray arm which extends at least around a substantial portion of the drum periphery so that spray emitted by the spray arm can cover the drum wall with water during operation.

43. The apparatus of claim 20, wherein the holding means can prevent damage to the drum during simultaneous testing of the drum and at pressures in excess of ten (10) p.s.i.

44. The apparatus of claim 20, wherein the holding means can prevent damage to the drum during simultaneous rotation and high pressure testing of the drum at pressures in excess of fifty (50) p.s.i.

45. The apparatus of claim 20, further comprising inflatable means extending circumferentially about the drum for defining at least in part a reservoir for immersing the top portion of the drum.

46. The apparatus of claim 45, further comprising means for inflating the inflatable means with air, and means for preventing over filling of the inflatable means with excess pressure.

47. The apparatus of claim 44, wherein the preventing means comprises at least in part a spring for presetting a desired pressure value for air used during the drum testing process.

48. The apparatus of claim 20, further comprising lance means for injecting the drum interior with pressurized air via a fitting on the drum exterior.

49. The apparatus of claim 48, wherein the lance includes moveable lance support means for moving the lance with respect to the drum between engaged and disengaged positions.

50. The apparatus of claim 49, further comprising water removal means associated with the lance support means for removing moisture adhering to the lance after testing and using air escaping from the drum.

* * * * *